United States Patent
Witzl

(10) Patent No.: US 12,534,422 B2
(45) Date of Patent: Jan. 27, 2026

(54) PROCESS FOR RECOVERING PROPYLENE

(71) Applicants: BASF SE, Ludwigshafen am Rhein (DE); Dow Global Technologies LLC, Midland, MI (US)

(72) Inventor: Werner J. Witzl, Stade (DE)

(73) Assignees: BASF SE, Ludwigshafen am Rhein (DE); Dow Global Technologies LLC, Midland, MI (US)

( * ) Notice: Subject to any disclaimer, the term of this patent is extended or adjusted under 35 U.S.C. 154(b) by 162 days.

(21) Appl. No.: 18/285,665

(22) PCT Filed: Apr. 8, 2022

(86) PCT No.: PCT/EP2022/059389
§ 371 (c)(1),
(2) Date: Oct. 5, 2023

(87) PCT Pub. No.: WO2022/214644
PCT Pub. Date: Oct. 13, 2022

(65) Prior Publication Data
US 2024/0368059 A1    Nov. 7, 2024

(30) Foreign Application Priority Data
Apr. 9, 2021   (EP) .................................. 21167579

(51) Int. Cl.
*C07C 7/09*       (2006.01)
*B01J 20/16*      (2006.01)

(52) U.S. Cl.
CPC .............. *C07C 7/09* (2013.01); *B01J 20/165* (2013.01); *B01J 2523/41* (2013.01); *B01J 2523/47* (2013.01)

(58) Field of Classification Search
None
See application file for complete search history.

(56) References Cited

U.S. PATENT DOCUMENTS

| 6,564,578 B1 * | 5/2003 | Fischer-Calderon ........................ F25J 1/0254 62/619 |
| 2008/0115529 A1 * | 5/2008 | Ransbarger ............ F25J 1/0085 62/613 |

(Continued)

FOREIGN PATENT DOCUMENTS

JP    2006-232744 A    9/2006

OTHER PUBLICATIONS

International Search Report and Written Opinion received for PCT Patent Application No. PCT/EP2022/059389, mailed on Aug. 18, 2022, 10 pages.

*Primary Examiner* — Tam M Nguyen
(74) *Attorney, Agent, or Firm* — Faegre Drinker Biddle & Reath LLP

(57) ABSTRACT

The present invention relates to a process for recovering propylene from a gaseous stream comprising propylene and a light-boiling compound, the light-boiling compound having a boiling point at 1013 mbar (abs.) below −50° C., in a condensing unit, wherein the condensing unit has a first zone, preferably being a condensing zone, and a second zone, preferably being an evaporation zone, wherein first and second zone are spatially separated from each other but are thermally conductive coupled to each other, the process comprising (i) providing a gaseous stream comprising propylene and a light-boiling compound;
(ii) providing a liquid cooling medium stream having a temperature $T_1$;
(iii) cooling the liquid cooling medium stream in two or more cooling steps to a temperature $T_4$, which is lower than the temperature $T_1$, thereby obtaining a liquid cooling medium stream having temperature $T_4$;

(Continued)

(iv) feeding the gaseous stream comprising propylene and a light-boiling compound from (i) into the first zone of the condensing unit and feeding the liquid cooling medium stream having the temperature $T_4$ obtained from (iii) to the second zone of the condensing unit;

(v) expanding the liquid cooling medium stream, preferably adiabatically, within the second zone, thereby obtaining from the first zone an at least partially liquid stream comprising propylene, which is depleted in light-boiling compounds compared to the stream provided in (i).

13 Claims, 4 Drawing Sheets

(56) References Cited

U.S. PATENT DOCUMENTS

| | | |
|---|---|---|
| 2016/0176835 A1 | 6/2016 | Riedel et al. |
| 2021/0094895 A1* | 4/2021 | Tuat Pham ............ F25J 3/0219 |

* cited by examiner

PROCESS FOR RECOVERING PROPYLENE

CROSS-REFERENCE TO RELATED APPLICATIONS

This application is a National stage application (under 35 U.S.C. § 371) of PCT/EP2022/059389, filed Apr. 8, 2022, which claims benefit of European Application No. 21167579.8, filed Apr. 9, 2021, both of which are incorporated herein by reference in their entirety.

The present invention relates to a process for recovering propylene from a gaseous stream comprising propylene and a light-boiling compound, the light-boiling compound having a boiling point at 1013 mbar (abs.) below −50° C., in a condensing unit, wherein the condensing unit has a first zone, preferably being a condensing zone, and a second zone, preferably being an evaporation zone, wherein first and second zone are spatially separated from each other but are thermally conductive coupled to each other, the process comprising: providing a gaseous stream comprising propylene and a light-boiling compound (i); providing a liquid cooling medium stream having a temperature $T_1$ (ii); cooling the liquid cooling medium stream in two or more cooling steps to a temperature $T_4$, which is lower than the temperature $T_1$, thereby obtaining a liquid cooling medium stream having temperature $T_4$ (iii); feeding the gaseous stream comprising propylene and a light-boiling compound from (i) into the first zone of the condensing unit and feeding the liquid cooling medium stream having the temperature $T_4$ obtained from (iii) to the second zone of the condensing unit (iv); and expanding the liquid cooling medium stream, preferably adiabatically, within the second zone, thereby obtaining from the first zone an at least partially liquid stream comprising propylene, which is depleted in light-boiling compounds compared to the stream provided in (i) (v).

Propylene oxide (PO) is one of the most important chemical intermediates in industry. It represents the starting compound for a broad spectrum of products, such as foams, solvents or de-icing agents. The development of catalysts based on zeolitic materials having a framework structure comprising Si, O, and Ti together with the improved availability of large quantities of hydrogen peroxide enabled the large-scale implementation of the so called HPPO technology. In an HPPO process, propylene oxide (PO) is prepared from propylene and hydrogen peroxide (HP) in aqueous organic solvents with zeolitic materials having a framework structure comprising Si, O, and Ti as catalysts: in one constellation, methanol is used as the solvent, typically in combination with a zeolitic material having a framework structure comprising Si, O, and Ti of framework type MFI (titanium silicalite-1, TS-1) as catalyst. In another constellation, acetonitrile is used as solvent, typically in combination with a zeolitic material having a framework structure comprising Si, O, and Ti of framework type MWW (TiMWW) as catalyst. However, a HPPO process also results in impurities, wherein the accumulation of certain light-boiling compounds in some sections of the process can lead either to potential safety issues or to their accumulation in a process up to levels that will disturb the smooth operation of the process or even lead to a product which is of unacceptable purity. These light-boiling components are either by-products from the epoxidation reaction or are impurities, which were already present in the raw material, especially in the educt propylene. In upstream processes of a typical HPPO process, these light-boiling compounds gradually accumulate in the reaction system and in the process streams and must therefore be removed. Especially since an economical HPPO process always comprises a recovery of the educt propylene and the recycling thereof into the epoxidation reaction, the detrimental light-boiling compounds gradually accumulate in the recovered/recycled propylene, and their removal is a main issue.

An option for removal of such light-boiling compounds from recovered propylene is distillation, another one is purging, wherein both options can be used alone or in combination—both resulting in substantial losses of propylene and/or require a substantial amount of energy. A further option is the purification of the recovered propylene by applying a propylene absorption column in combination with a light-boilers removal column; however, also this option is at least energy consuming. JP 2006-232744 A describes a method of separating and removing light-boiling compounds contained in propylene by using a combination of a separator and a cooler. A propylene stream coming from the separator is cooled in the cooler and is then refluxed to the separator as reflux propylene containing concentrated propylene. The cooling of the cooler is performed by feeding liquid propylene as a cooling agent into the jacket of the cooler and vaporizing it therein. When simulating the process of JP 2006-232744 A, it became apparent that the process is by far not economically advantageous: only about two thirds of the liquid propylene feed stream used as cooling agent are indeed used for evaporative cooling in the cooler. About one third of that stream is simply flashed off in order to de-superheat the liquid propylene feed stream from its 40° C. feed temperature to −8° C. Having regard to energetical economy, this represents a clear disadvantage since such evaporated propylene stream is normally—in a typical HPPO process-recycled back into the epoxidation process and would need to be subsequently processed as a liquid stream. Furthermore, JP 2006-232744 A is silent regarding water still contained in the gaseous stream of propylene and light-boiling components to be treated. In oxidation processes, as is the production of propylene oxide from propylene and hydrogen peroxide in the presence of a catalyst, i.e. a typical HPPO process, water is always present. However, a drying step is not mentioned in JP 2006-232744 A, although sub-freezing process temperatures are disclosed. This leads to the conclusion that the gaseous stream to be treated is either always "bone dry" or, that sub-freezing temperatures—although being an essential feature of the process of JP 2006-232744 A—would not be feasible.

It was therefore an object of the present invention to provide a process for recovering propylene from a HPPO stream comprising propylene and a light-boiling compound, which is effective, especially in view of energetic aspects, and allows recovering the propylene in high purity with only traces of light-boiling compounds.

1st Aspect—Process for Recovering Propylene

In a first aspect, the invention thus relates to a process for recovering propylene from a gaseous stream comprising propylene and a light-boiling compound, the light-boiling compound having a boiling point at 1013 mbar (abs.) below −50° C., in a condensing unit, wherein the condensing unit has a first zone, preferably being a condensing zone, and a second zone, preferably being an evaporation zone, wherein first and second zone are spatially separated from each other but are thermally conductive coupled to each other, the process comprising (i) providing a gaseous stream comprising propylene and a light-boiling compound;

(ii) providing a liquid cooling medium stream having a temperature $T_1$;

(iii) cooling the liquid cooling medium stream in two or more cooling steps to a temperature $T_4$, which is lower than the temperature $T_1$, thereby obtaining a liquid cooling medium stream having temperature $T_4$;

(iv) feeding the gaseous stream comprising propylene and a light-boiling compound from (i) into the first zone of the condensing unit and feeding the liquid cooling medium stream having the temperature $T_4$ obtained from (iii) to the second zone of the condensing unit;

(v) expanding the liquid cooling medium stream, preferably adiabatically, within the second zone, thereby obtaining from the first zone an at least partially liquid stream comprising propylene, which is depleted in light-boiling compounds compared to the stream provided in (i).

Surprisingly, it was found that the inventive process enables a recovery of propylene in very good yields. The amount of disadvantageous light-boiling compounds could substantially be reduced by the inventive process, thus avoiding a disadvantageous re-introduction of light-boiling compounds in case of recycling. Furthermore, in view of the recycling of the liquid cooling medium stream, which is preferably also propylene, back to the epoxidation process as makeup stream of the main liquid propylene feed stream of the epoxidation process, it is required to keep the mass flowrate for the liquid cooling medium stream as low as possible since otherwise the recycling of said cooling medium stream would be economically disadvantageous. Especially the use of at least two cooling steps positively affected the required mass flowrate of liquid cooling medium, i.e. allows to keep the mass flowrate at a considerable low level.

In the process for recovering propylene from a gaseous stream comprising propylene and a light-boiling compound according to the present invention, it is preferred that cooling the liquid cooling medium stream from temperature $T_1$ to temperature $T_4$ in (iii) is done in at least three cooling steps comprising:

(iii.1) cooling the liquid cooling medium stream from $T_1$ to a temperature $T_2$, which is lower than $T_1$;

(iii.2) cooling the liquid cooling medium stream having temperature $T_2$ to a temperature $T_3$, which is lower than $T_2$ and higher than $T_4$;

(iii.3) cooling the liquid cooling medium stream having temperature $T_3$ to temperature $T_4$.

In the process for recovering propylene from a gaseous stream comprising propylene and a light-boiling compound according to the present invention, it is preferred that a gaseous stream is obtained from the first zone in (v) comprising propylene and a light-boiling compound, which is depleted in propylene compared to the stream provided in (i), and which has temperature $T_5$ and wherein said further stream is used in any one of (iii.1), (iii.2) and (iii.3) to cool the liquid cooling medium by heat exchange, more preferably to cool the liquid cooling medium in (iii.1) by heat exchange from $T_1$ to $T_2$ in a heat exchanger unit. Preferably, the at least partially liquid stream comprising propylene, which is depleted in light-boiling compounds obtained in (v) has temperature $T_5$ and said stream is used in any one of (iii.1), (iii.2) and (iii.3) to cool the liquid cooling medium by heat exchange, preferably to cool the liquid cooling medium in (iii.2) by heat exchange from $T_2$ to $T_3$ in a heat exchanger unit.

In the process for recovering propylene from a gaseous stream comprising propylene and a light-boiling compound according to the present invention, it is preferred that in (v) a stream comprising gaseous cooling medium having a temperature $T_6$, which is lower than $T_4$, is obtained from the second zone and said gaseous cooling medium stream having temperature $T_6$ coming from the condensing unit is used in any one of (iii.1), (iii.2) and (iii.3) to cool the liquid cooling medium prior to entering the condensing unit by heat exchange, more preferably to cool the liquid cooling medium stream having temperature $T_3$ in (iii.3) by heat exchange to temperature $T_4$ in a heat exchanger unit, wherein the cooling medium stream, which has entered (iii.3) with $T_6$, leaves the heat exchanger unit with temperature $T_7$, which is higher than $T_6$.

In the process for recovering propylene from a gaseous stream comprising propylene and a light-boiling compound according to the present invention, it is preferred that in each step (iii.1), (iii.2) and (iii.3) the cooling of the liquid cooling medium stream is done by heat exchange in a heat exchanger unit and the minimum temperature difference between the temperature of the stream comprising the liquid cooling medium, either at the inlet into the heat exchanger unit or at the outlet of the heat exchanger unit, and the temperature of the respective stream used for cooling the liquid cooling medium either at the inlet into the heat exchanger unit or at the outlet of the heat exchanger unit, is in the range of from 1 to 10° C., more preferably in the range of from 1.5 to 9° C., more preferably in the range of from 2 to 8° C.

In the process for recovering propylene from a gaseous stream comprising propylene and a light-boiling compound according to the present invention, it is preferred that $T_6$ is a temperature ≥the boiling temperature of the cooling medium, preferably a temperature in the range of from the boiling temperature of the cooling medium to a temperature 5° C. above the boiling temperature of the cooling medium; and/or wherein $T_4$ is a temperature >the boiling temperature of the cooling medium, more preferably in the range of from a temperature 10° C. above the boiling temperature of the cooling medium to a temperature 2° C. above the boiling temperature of the cooling medium, more preferably in the range of from a temperature 7° C. above the boiling temperature of the cooling medium to a temperature 3° C. above the boiling temperature of the cooling medium.

In the process for recovering propylene from a gaseous stream comprising propylene and a light-boiling compound according to the present invention, it is preferred that at least one of (i), (ii), (iii) and (iv), more preferably at least two of (i), (ii), (iii) and (iv), more preferably at least three of (i), (ii), (iii) and (iv), more preferably (i), (ii), (iii) and (iv) are carried out at a pressure in the range of from 5 to 45 bar (abs.), preferably in the range of from 20 to 30 bar (abs.).

In the process for recovering propylene from a gaseous stream comprising propylene and a light-boiling compound according to the present invention, it is preferred that the gaseous cooling medium stream obtained from the second zone in (v) has a pressure in the range of from 0.7 to 5 bar (abs.), more preferably in the range of from 0.85 to 2.5 bar (abs.), more preferably in the range of from 1 to 1.5 bar (abs.).

In the process for recovering propylene from a gaseous stream comprising propylene and a light-boiling compound according to the present invention, it is preferred that the at least partially liquid stream comprising propylene obtained from the first zone in (v), which is depleted in light-boiling compounds compared to the stream provided in (i), has a pressure in the range of from 20 to 30 bar (abs.).

In the process for recovering propylene from a gaseous stream comprising propylene and a light-boiling compound according to the present invention, it is preferred that the gaseous stream obtained from the first zone in (v) comprising propylene and a light-boiling compound, which is depleted in propylene compared to the stream provided in (i) has a pressure in the range of from 20 to 30 bar (abs.).

In the process for recovering propylene from a gaseous stream comprising propylene and a light-boiling compound according to the present invention, it is preferred that the light-boiling compound is a compound having a boiling point at 1013 mbar (abs.) in the range of from $-260$ to $-60°$ C., wherein the light-boiling compound is more preferably selected from the group consisting of hydrogen, nitrogen, oxygen, carbon dioxide, carbon monoxide, ethane, ethylene, acetylene, methane and mixtures of two or more thereof, preferably from the group consisting of hydrogen, nitrogen, oxygen, carbon dioxide, carbon monoxide, ethane, ethylene, methane and mixtures of two or more thereof, more preferably from the group consisting of ethane, methane, hydrogen, oxygen, carbon dioxide, carbon monoxide and mixtures of two or more thereof, wherein the light-boiling compound at least comprises ethane and/or methane. Boiling points of these compounds at 1013 mbar (abs.) are as follows: carbon dioxide ($CO_2$) $-56.6°$ C. (triple point at 5.18 bar (abs.)); acetylene $-84.9°$ C., ethane $-88.7°$ C., ethylene $-103.7°$ C., methane $-161.5°$ C., oxygen ($O_2$) $-183°$ C., argon (Ar) $-186°$ C.; carbon monoxide (CO) $-191.5°$ C., nitrogen ($N_2$) $-195.8°$ C., hydrogen ($H_2$) $-252.8°$ C.

In the process for recovering propylene from a gaseous stream comprising propylene and a light-boiling compound according to the present invention, it is preferred that providing the stream comprising propylene and a light-boiling compound according to (i) comprises (i.1) providing a stream comprising propylene, water and a light-boiling compound, wherein the water content is in the range of from 100 to 7500 weight-ppm based on the total weight of the stream;

(i.2) drying the stream provided in (i.1), preferably in one or more drying units, wherein at least one drying unit preferably comprise a molecular sieve, thereby obtaining a stream comprising propylene, water and a light-boiling compound, wherein the water content is lower than in the stream provided in (i.1), more preferably in the range of from 0.1 to 150 weight-ppm water, more preferably in the range of from 0.5 to 100 weight-ppm water, more preferably in the range of from 1 to 3 weight-ppm water, based on the total weight of the stream, wherein preferably the vapor dew point temperature of said stream is below temperature $T_6$.

Having a water content in the stream comprising propylene, water and a light-boiling compound obtained from (i.2) so that the vapor dew point temperature of said stream is below temperature $T_6$ prevents water freezing. A stream enriched in water is removed, preferably discontinuously, in (i.2).

In the process for recovering propylene from a gaseous stream comprising propylene and a light-boiling compound according to the present invention, it is preferred that in the range of from 90 to 100 weight-%, more preferably in the range of from 95 to 100 weight-%, more preferably in the range of from 98 to 100 weight-%, more preferably in the range of from 99 to 100 weight-% of the stream comprising propylene and a light-boiling compound provided according to (i) and/or of the stream comprising propylene, water and a light-boiling compound provided according to (i.1) are gaseous, based on the total weight of said stream. Preferably, the stream comprising propylene and a light-boiling compound provided according to (i) and/or the stream comprising propylene, water and a light-boiling compound provided according to (i.1) has a temperature in the range of from 5 to 50° C., more preferably in the range of from 10 to 20° C. Preferably, the stream comprising propylene and a light-boiling compound provided according to (i) and/or the stream comprising propylene, water and a light-boiling compound provided according to (i.1) comprise in the range of from 10 to 90 weight-%, preferably in the range of from 30 to 70 weight-%, more preferably in the range of from 40 to 60 weight-% of propylene, based on the total weight of the respective stream. Preferably, the stream comprising propylene, and a light-boiling compound provided according to (i) and/or the stream comprising propylene, water and a light-boiling compound provided according to (i.1) comprise in the range of from 10 to 70 weight-%, more preferably in the range of from 20 to 60 weight-%, more preferably in the range of from 30 to 50 weight-% of light-boiling compounds, based on the total weight of the respective stream.

In the process for recovering propylene from a gaseous stream comprising propylene and a light-boiling compound according to the present invention, it is preferred that at least 90 weight-%, more preferably at least 95 weight-%, more preferably at least 98 weight-%, more preferably at least 99 weight-% of the stream comprising propylene obtained in (v), which is depleted in light-boiling compounds compared to the stream provided in (i), are liquid, based on the total weight of said stream. Preferably, the stream which is depleted in light-boiling compounds obtained according to (v) comprise in the range of from 30 to 90 weight-%, more preferably in the range of from 40 to 80 weight-%, more preferably in the range of from 50 to 70 weight-% of propylene, based on the total weight of the stream. Preferably, the stream depleted in propylene obtained according to (v) comprise in the range of from 40 to 98 weight-%, more preferably in the range of from 60 to 95 weight-%, more preferably in the range of from 70 to 90 weight-% of light-boiling compounds, based on the total weight of the stream.

In the process for recovering propylene from a gaseous stream comprising propylene and a light-boiling compound according to the present invention, it is preferred that the stream which is depleted in light-boiling compounds obtained according to (v) is used for cooling in (iii.2), wherein a liquid stream comprising propylene is obtained from (iii.2), which is further depleted in light-boiling compounds compared to the stream comprising propylene obtained in (v), which is used for cooling in (iii.2), wherein more preferably the liquid stream obtained from (iii.2) comprises at least 1, preferably at least 2 weight-%, more preferably at least 3 weight-%, more preferably at least 4 weight-%, more preferably at least 5 weight-% less light-boiling compounds than the stream obtained according to (v), each based on the total weight of the liquid stream obtained from (iii.2). Preferably, the liquid stream comprising propylene obtained from (iii.2) comprises in the range of from 70 to 100 weight-%, more preferably in the range of from 75 to 98 weight-%, more preferably in the range of from 85 to 95 weight-% of the propylene in the stream obtained according to (v). Preferably, the liquid stream comprising propylene obtained from (iii.2) comprises in the range of from 50 to 90 weight-%, more preferably in the range of from 60 to 80 weight-%, more preferably in the range of from 65 to 75 weight-%, of propylene, based on the total weight of the liquid stream. Preferably, the liquid stream comprising propylene obtained from (iii.2) comprises in the range of from 10 to 50 weight-%, more preferably in the range of from 20 to 40 weight-%, more preferably in the range of from 25 to 35 weight-% of light-boiling compounds, based on the total weight of the liquid stream.

In the process for recovering propylene from a gaseous stream comprising propylene and a light-boiling compound according to the present invention, it is preferred that a gaseous stream is obtained from (iii.2), which is enriched in light-boiling compounds compared to the stream comprising propylene obtained in (v), which is used for cooling in (iii.2), wherein more preferably the gaseous stream obtained from (iii.2) comprises at least 5, preferably at least 10 weight-%, more preferably at least 15 weight-%, more preferably at least 20 weight-%, more preferably at least 30 weight-% more light-boiling compounds than the stream obtained according to (v), each based on the total weight of the gaseous stream obtained from (iii.2). Preferably, the gaseous stream obtained from (iii.2) comprises in the range of from 50 to 90 weight-%, more preferably in the range of from 60 to 85 weight-%, in the range of from 62 to 85 weight-% of light-boiling compounds, based on the total weight of the gaseous stream. Preferably, the gaseous stream obtained from (iii.2) comprises in the range of from 10 to 50 weight-%, more preferably in the range of from 15 to 40 weight-%, more preferably in the range of from 15 to 38 weight-% of propylene, based on the total weight of the gaseous stream. The partial re-evaporation of the stream comprising propylene obtained in (v) in a heat exchanger is advantageous since it enables dissolving further amounts of light-boiling compounds still contained in said stream. The resulting liquid stream obtained from (iii.2) is more suitable, optionally after one or more workup steps, for recycling.

In the process for recovering propylene from a gaseous stream comprising propylene and a light-boiling compound according to the present invention, it is preferred that the cooling medium stream comprises propylene, wherein more preferably at least 90 weight-%, preferably at least 95 weight-%, more preferably at least 98 weight-%, more preferably at least 99 weight-% of the cooling medium stream provided according to (ii) consists of propylene, based on the total weight of the cooling medium stream.

In the process for recovering propylene from a gaseous stream comprising propylene and a light-boiling compound according to the present invention, it is preferred that the stream comprising propylene and a light-boiling compound provided according to (i) is a downstream process stream from an epoxidation process, wherein a feed stream comprising propylene and propane is reacted with hydrogen peroxide in an aqueous organic solvent mixture in the presence of an epoxidation catalyst, thereby obtaining a stream comprising propylene, propane, propylene oxide, water, and organic solvent; wherein downstream of said epoxidation process a stream S1 comprising propylene, propane, and a light-boiling compound is introduced into a distillation unit and subjected to distillation conditions in said distillation unit, thereby obtaining a side stream S2, which is enriched in propylene compared to S1, a bottoms stream S3, which is enriched in propane compared to S1, and a gaseous top stream S4 comprising propylene and a light-boiling compound, wherein S4 represents the stream comprising propylene and a light-boiling compound provided according to (i).

In the process for recovering propylene from a gaseous stream comprising propylene and a light-boiling compound according to the present invention, it is preferred that the at least partially liquid stream comprising propylene obtained in (v), which is depleted in light-boiling compounds as described above, and/or the liquid stream comprising propylene obtained from (iii.2) as described above, each optionally after one or more work-up steps, is used as a feed stream for preparing the stream comprising propylene and a light-boiling compound provided in (i) and/or is used as part of a feed stream for the epoxidation process.

In the process for recovering propylene from a gaseous stream comprising propylene and a light-boiling compound according to the present invention, it is preferred that the cooling medium stream comprises propylene and the cooling medium stream having a temperature $T_6$ as described above, and/or the cooling medium stream having temperature $T_7$ as described above, optionally after one or more work-up steps, is used as a feed stream for preparing the stream comprising propylene and a light-boiling compound provided in (i) and/or is used as part of a feed stream for the epoxidation process.

2nd Aspect—Process for the Preparation of Propylene Oxide

A second aspect of the present invention relates to a process for the preparation of propylene oxide comprising:
  (a) providing a reaction mixture comprising propylene, water, organic solvent, and hydrogen peroxide;
  (b) contacting the reaction mixture provided in (a) in an epoxidation zone with an epoxidation catalyst comprising a zeolitic material having a framework structure comprising Si, O, and Ti, and subjecting the reaction mixture to epoxidation reaction conditions in the epoxidation zone, obtaining, in the epoxidation zone, a mixture comprising propylene oxide, water, and organic solvent;
  (c) removing an effluent stream from the epoxidation zone, the effluent stream comprising propylene oxide, water, and organic solvent;
  wherein the at least partially liquid stream comprising propylene obtained in (v), which is depleted in light-boiling compounds as described above with respect to the first aspect of the present invention, and/or the liquid stream comprising propylene obtained from (iii.2) as described above with respect to the first aspect of the present invention, and/or the cooling medium stream having a temperature $T_6$ as described above with respect to the first aspect of the present invention and/or the cooling medium stream having temperature $T_7$ as described above with respect to the first aspect of the present invention, each optionally after one or more work-up steps, is used as a propylene feed stream for preparing the reaction mixture provided according to (a).

All details disclosed above with respect to the first aspect of the present invention also apply for the second aspect of the present invention.

In the process for the preparation of propylene oxide according to the present invention, it is preferred that the epoxidation catalyst comprises a zeolitic material having a framework structure comprising Si, O, and Ti. Preferably, the zeolitic material comprises Ti in an amount in the range of from 0.2 to 5 weight-%, more preferably in the range of from 0.5 to 4 weight-%, more preferably in the range of from 1.0 to 3 weight-%, more preferably in the range of from 1.2 to 2.5 weight-%, more preferably in the range of from 1.4 to 2.2 weight-%, calculated as elemental Ti and based on the total weight of the zeolitic material. Preferably, the zeolitic material having a framework structure comprising Si, O, and Ti comprised in the epoxidation catalyst is a titanium zeolite having ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, CDO, CFI, CGF, CGS, CHA, CHI, CLO, CON, CZP, DAC, DDR, DFO, DFT, DOH, DON, EAB, EDI, EMT, EPI, ERI, ESV, ETR, EUO, FAU, FER, FRA, GIS, GIU, GME, GON, GOO, HEU, IFR, ISV, ITE, ITH, ITQ, ITW, IWR, IWW, JBW, KFI, LAU, LEV, LIO, LOS, LOV, LTA, LTL, LTN, MAR, MAZ, MCM-22 (S), MCM-36, MCM-56, MEI, MEL, MEP, MER, MIT-1, MMFI, MFS, MON, MOR, MSE, MSO, MTF, MTN, MTT, MTW, MWW, NAB, NAT, NEES, NON, NPO, OBW, OFF, OSI, OSO, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN SFO, SGT, SOD, SSY, STF, STI, STT, TER, THO, TON, TSC, UEI, UFI, UOZ, USI, UTL, VET, VFI, VNI, VSV, WEI, WEN, YUG, ZON SVR, SVY framework structure or a mixed structure of two or more of these framework types; more preferably the zeolitic material having a framework structure comprising Si, O, and Ti is a titanium zeolite having an MFI framework type, an MEL framework type, an MWW framework type, an MCM-22 (S) framework type, an MCM-56 framework type, an IEZ-MWW framework type, an MCM-36 framework type, an ITQ framework type, a BEA framework type, a MOR framework type, or a mixed structure of two or more of these framework types; more preferably an MFI framework type, or an MWW framework type; more preferably the zeolitic material having a framework structure comprising Si, O, and Ti has framework type MFI; more preferably the zeolitic material having a framework structure comprising Si, O, and Ti is a titanium silicalite-1 (TS-1).

In the process for the preparation of propylene oxide according to the present invention, it is preferred that the epoxidation catalyst further comprises a binder. Preferably, the epoxidation catalyst is in the form of a molding, more preferably in the form of an extrudate or a granule. Preferably, from 95 to 100 weight-%, preferably from 98 to 100 weight-%, more preferably from 99 to 100 weight-%, more preferably from 99.5 to 100 weight-%, more preferably from 99.9 to 100 weight-% of the molding consist of the zeolitic material and the binder. Preferably from 95 to 100 weight-%, more preferably from 98 to 100 weight-%, more preferably from 99 to 100 weight-%, more preferably from 99.5 to 100 weight-%, more preferably from 99.9 to 100 weight-% of the binder comprised in the molding consist of Si and O.

The epoxidation catalyst, preferably the molding, comprises the binder, calculated as $SiO_2$, preferably in an amount in the range of from 2 to 90 weight-%, more preferably in the range of from 5 to 70 weight-%, more preferably in the range of from 10 to 50 weight-%, more preferably in the range of from 15 to 30 weight-%, more preferably in the range of from 20 to 25 weight-%, based on the total weight of the epoxidation catalyst, preferably based on the total weight of the molding and/or wherein the epoxidation catalyst, preferably the molding, comprises the zeolitic material in an amount in the range of from 10 to 98 weight-%, preferably in the range of from 30 to 95 weight-%, more preferably in the in the range of from 50 to 90 weight-%, more preferably in the range of from 70 to 85 weight-%, more preferably in the range of from 75 to 80 weight-%, based on the total weight of the epoxidation catalyst, preferably based on the total weight of the molding.

In the process for the preparation of propylene oxide according to the present invention, it is preferred that the hydrogen peroxide is provided as aqueous hydrogen peroxide solution, which preferably has a total organic carbon content (TOC) in the range of from 100 to 800 mg per kg hydrogen peroxide comprised in the aqueous hydrogen peroxide solution, preferably in the range of from 120 to 750 mg per kg hydrogen peroxide comprised in the aqueous hydrogen peroxide solution, more preferably in the range of from 150 to 700 mg per kg hydrogen peroxide comprised in the aqueous hydrogen peroxide solution, determined according to DIN EN 1484 (April 2019). Preferably, the hydrogen peroxide has a pH in the range of from 0 to 3.0, more preferably in the range of from 0.1 to 2.5, more preferably in the range of from 0.5 to 2.3, determined with a pH sensitive glass electrode according to CEFIC PEROXY-GENS H2O2 AM-7160 standard (2003). Preferably, the hydrogen peroxide comprises from 20 to 85 weight-%, more preferably from 30 to 75 weight-%, more preferably from 40 to 70 weight-% of hydrogen peroxide, relative to the total weight of the aqueous hydrogen peroxide solution. Preferably, the hydrogen peroxide is obtained or obtainable from an anthraquinone process.

In the process for the preparation of propylene oxide according to the present invention, it is preferred that the organic solvent is an organic epoxidation solvent, more preferably the organic solvent is selected from the group consisting of alcohol, acetonitrile, propionitrile and mixtures of two or more thereof; more preferably selected from the group consisting of alcohol, acetonitrile and mixtures of alcohol and acetonitrile; more preferably the organic solvent comprises at least an alcohol, wherein the alcohol is preferably a C1 to C5 mono alcohol or a mixture of two or more C1 to C5 alcohols, more preferably the alcohol comprises at least methanol.

In the process for the preparation of propylene oxide according to the present invention, it is preferred that the reaction mixture provided in (a) comprises an additive, wherein the additive is preferably selected from the group consisting of potassium salt, ammonia, ammonium salt, etidronic acid, salt of etidronic acid, and mixtures of two or more thereof, more preferably selected from the group consisting of potassium dihydrogen phosphate, dipotassium hydrogen phosphate, potassium formate, potassium acetate, potassium hydrogen carbonate, etidronic acid, ammonium dihydrogen phosphate, diammonium hydrogen phosphate, ammonia and mixtures of two or more thereof, preferably from the group consisting of potassium dihydrogen phosphate, dipotassium hydrogen phosphate, etidronic acid, ammonia and mixtures of two or more thereof, wherein the additive more preferably comprises at least dipotassium hydrogen phosphate.

In the process for the preparation of propylene oxide according to the present invention, it is preferred that the contacting under epoxidation reaction conditions in the epoxidation zone with the epoxidation catalyst in (b) is carried out at an absolute pressure in the epoxidation zone in the range of from 5 to 50 bar (abs.), more preferably in the range of from 15 to 30 bar (abs.), more preferably in the range of from 18 to 28 bar (abs.). Preferably, the contacting under epoxidation reaction conditions in the epoxidation zone with the epoxidation catalyst in (b) is carried out at a temperature in the epoxidation zone in the range of from 20 to 75° C., more preferably in the range of from 25 to 75° C., more preferably in the range of from 28 to 70° C., more preferably in the range of from 30 to 65° C. The temperature in the epoxidation zone in the context of this application is defined as the entrance temperature of the cooling medium to the jacket of the reactor. In case there is more than one entrance or even more than one reaction zone each with a separate entrance for the cooling medium, then the temperature in the reaction zone will be defined as the weight averaged temperature of all the cooling medium feeding streams.

In the process for the preparation of propylene oxide according to the present invention, it is preferred that the epoxidation reaction conditions comprise trickle bed conditions. In the process for the preparation of propylene oxide according to the present invention, it is alternatively preferred that the epoxidation reaction conditions comprise fixed bed conditions.

The present invention is further illustrated by the following set of embodiments and combinations of embodiments resulting from the dependencies and back-references as indicated. In particular, it is noted that in each instance where a range of embodiments is mentioned, for example in the context of a term such as "any one of embodiments (1) to (4)", every embodiment in this range is meant to be explicitly disclosed for the skilled person, i.e. the wording of this term is to be understood by the skilled person as being synonymous to "any one of embodiments (1), (2), (3), and (4)". Further, it is explicitly noted that the following set of embodiments is not the set of claims determining the extent of protection, but represents a suitably structured part of the description directed to general and preferred aspects of the present invention.

1. A process for recovering propylene from a gaseous stream comprising propylene and a light-boiling compound, the light-boiling compound having a boiling point at 1013 mbar (abs.) below −50° C., in a condensing unit, wherein the condensing unit has a first zone, preferably being a condensing zone, and a second zone, preferably being an evaporation zone, wherein first and second zone are spatially separated from each other but are thermally conductive coupled to each other, the process comprising
   (i) providing a gaseous stream comprising propylene and a light-boiling compound;
   (ii) providing a liquid cooling medium stream having a temperature $T_1$;
   (iii) cooling the liquid cooling medium stream in two or more cooling steps to a temperature $T_4$, which is lower than the temperature $T_1$, thereby obtaining a liquid cooling medium stream having temperature $T_4$;
   (iv) feeding the gaseous stream comprising propylene and a light-boiling compound from (i) into the first zone of the condensing unit and feeding the liquid cooling medium stream having the temperature $T_4$ obtained from (iii) to the second zone of the condensing unit;
   (v) expanding the liquid cooling medium stream, preferably adiabatically, within the second zone, thereby obtaining from the first zone an at least partially liquid stream comprising propylene, which is depleted in light-boiling compounds compared to the stream provided in (i).

2. The process of embodiment 1, wherein cooling the liquid cooling medium stream from temperature $T_1$ to temperature $T_4$ in (iii) is done in at least three cooling steps comprising:
   (iii.1) cooling the liquid cooling medium stream from $T_1$ to a temperature $T_2$, which is lower than $T_1$;
   (iii.2) cooling the liquid cooling medium stream having temperature $T_2$ to a temperature $T_3$, which is lower than $T_2$ and higher than $T_4$;
   (iii.3) cooling the liquid cooling medium stream having temperature $T_3$ to temperature $T_4$.

3. The process of embodiment 2, wherein a gaseous stream is obtained from the first zone in (v) comprising propylene and a light-boiling compound, which is depleted in propylene compared to the stream provided in (i), and which has temperature $T_5$ and wherein said further stream is used in any one of (iii.1), (iii.2) and (iii.3) to cool the liquid cooling medium by heat exchange, preferably to cool the liquid cooling medium in (iii.1) by heat exchange from $T_1$ to $T_2$ in a heat exchanger unit.

4. The process of embodiment 2 or 3, wherein the at least partially liquid stream comprising propylene, which is depleted in light-boiling compounds obtained in (v) has temperature $T_5$ and said stream is used in any one of (iii.1), (iii.2) and (iii.3) to cool the liquid cooling medium by heat exchange, preferably to cool the liquid cooling medium in (iii.2) by heat exchange from $T_2$ to $T_3$ in a heat exchanger unit.

5. The process of any one of embodiments 2 to 4, wherein in (v) a stream comprising gaseous cooling medium having a temperature $T_6$, which is lower than $T_4$, is obtained from the second zone and said gaseous cooling medium stream having temperature $T_6$ coming from the condensing unit is used in any one of (iii.1), (iii.2) and (iii.3) to cool the liquid cooling medium prior to entering the condensing unit by heat exchange, preferably to cool the liquid cooling medium stream having temperature $T_3$ in (iii.3) by heat exchange to temperature $T_4$ in a heat exchanger unit, wherein the cooling medium stream, which has entered (iii.3) with $T_6$, leaves the heat exchanger unit with temperature $T_7$, which is higher than $T_6$.

6. The process of any one of embodiments 2 to 5, wherein in each step (iii.1), (iii.2) and (iii.3) the cooling of the liquid cooling medium stream is done by heat exchange in a heat exchanger unit and the minimum temperature difference between the temperature of the stream comprising the liquid cooling medium, either at the inlet into the heat exchanger unit or at the outlet of the heat exchanger unit, and the temperature of the respective stream used for cooling the liquid cooling medium either at the inlet into the heat exchanger unit or at the outlet of the heat exchanger unit, is in the range of from 1 to 10° C., preferably in the range of from 1.5 to 9° C., more preferably in the range of from 2 to 8° C.

7. The process of any one of embodiments 1 to 6, wherein $T_6$ is a temperature ≥the boiling temperature of the cooling medium, preferably a temperature in the range of from the boiling temperature of the cooling medium to a temperature 5° C. above the boiling temperature of the cooling medium; and/or wherein $T_4$ is a temperature >the boiling temperature of the cooling medium, preferably in the range of from a temperature 10° C. above the boiling temperature of the cooling medium to a temperature 2° C. above the boiling temperature of the cooling medium, more preferably in the range of from a temperature 7° C. above the boiling temperature of the cooling medium to a temperature 3° C. above the boiling temperature of the cooling medium.

8. The process of any one of embodiments 1 to 7, wherein at least one of (i), (ii), (iii) and (iv), preferably at least two of (i), (ii), (iii) and (iv), more preferably at least three of (i), (ii), (iii) and (iv), more preferably (i), (ii), (iii) and (iv) are carried out at a pressure in the range of from 5 to 45 bar (abs.), preferably in the range of from 20 to 30 bar (abs.).

9. The process of any one of embodiments 1 to 8, wherein the gaseous cooling medium stream obtained from the second zone in (v) has a pressure in the range of from 0.7 to 5 bar (abs.), preferably in the range of from 0.85 to 2.5 bar (abs.), more preferably in the range of from 1 to 1.5 bar (abs.).
10. The process of any one of embodiments 1 to 9, wherein the at least partially liquid stream comprising propylene obtained from the first zone in (v), which is depleted in light-boiling compounds compared to the stream provided in (i), has a pressure in the range of from 20 to 30 bar (abs.).
11. The process of any one of embodiments 3 to 10, wherein the gaseous stream obtained from the first zone in (v) comprising propylene and a light-boiling compound, which is depleted in propylene compared to the stream provided in (i) has a pressure in the range of from 20 to 30 bar (abs.).
12. The process of any one of embodiments 1 to 11, wherein the light-boiling compound is a compound having a boiling point at 1013 mbar (abs.) in the range of from −260 to −60° C., wherein the light-boiling compound is preferably selected from the group consisting of hydrogen, nitrogen, oxygen, carbon dioxide, carbon monoxide, ethane, ethylene, acetylene, methane and mixtures of two or more thereof, preferably from the group consisting of hydrogen, nitrogen, oxygen, carbon dioxide, carbon monoxide, ethane, ethylene, methane and mixtures of two or more thereof, more preferably from the group consisting of ethane, methane, hydrogen, oxygen, carbon dioxide, carbon monoxide and mixtures of two or more thereof, wherein the light-boiling compound at least comprises ethane and/or methane.
13. The process of any one of embodiments 1 to 12, wherein providing the stream comprising propylene and a light-boiling compound according to (i) comprises
    (i.1) providing a stream comprising propylene, water and a light-boiling compound, wherein the water content is in the range of from 100 to 7500 weight-ppm based on the total weight of the stream;
    (i.2) drying the stream provided in (i.1), preferably in one or more drying units, wherein at least one drying unit preferably comprise a molecular sieve, thereby obtaining a stream comprising propylene, water and a light-boiling compound, wherein the water content is lower than in the stream provided in (i.1), preferably in the range of from 0.1 to 150 weight-ppm water, more preferably in the range of from 0.5 to 100 weight-ppm water, more preferably in the range of from 1 to 3 weight-ppm water, based on the total weight of the stream, wherein preferably the vapor dew point temperature of said stream is below temperature $T_6$.
14. The process of any one of embodiments 1 to 13, wherein in the range of from 90 to 100 weight-%, preferably in the range of from 95 to 100 weight-%, more preferably in the range of from 98 to 100 weight-%, more preferably in the range of from 99 to 100 weight-% of the stream comprising propylene and a light-boiling compound provided according to (i) and/or of the stream comprising propylene, water and a light-boiling compound provided according to (i.1) are gaseous, based on the total weight of said stream.
15. The process of any one of embodiments 1 to 14, wherein the stream comprising propylene and a light-boiling compound provided according to (i) and/or the stream comprising propylene, water and a light-boiling compound provided according to (i.1) has a temperature in the range of from 5 to 50° C., preferably in the range of from 10 to 20° C.
16. The process of any one of embodiments 1 to 15, wherein the stream comprising propylene and a light-boiling compound provided according to (i) and/or the stream comprising propylene, water and a light-boiling compound provided according to (i.1) comprise in the range of from 10 to 90 weight-%, preferably in the range of from 30 to 70 weight-%, more preferably in the range of from 40 to 60 weight-% of propylene, based on the total weight of the respective stream.
17. The process of any one of embodiments 1 to 16, wherein the stream comprising propylene, and a light-boiling compound provided according to (i) and/or the stream comprising propylene, water and a light-boiling compound provided according to (i.1) comprise in the range of from 10 to 70 weight-%, preferably in the range of from 20 to 60 weight-%, more preferably in the range of from 30 to 50 weight-% of light-boiling compounds, based on the total weight of the respective stream.
18. The process of any one of embodiments 1 to 17, wherein at least 90 weight-%, preferably at least 95 weight-%, more preferably at least 98 weight-%, more preferably at least 99 weight-% of the stream comprising propylene obtained in (v), which is depleted in light-boiling compounds compared to the stream provided in (i), are liquid, based on the total weight of said stream.
19. The process of any one of embodiments 1 to 18, wherein the stream which is depleted in light-boiling compounds obtained according to (v) comprise in the range of from 30 to 90 weight-%, preferably in the range of from 40 to 80 weight-%, more preferably in the range of from 50 to 70 weight-% of propylene, based on the total weight of the stream.
20. The process of any one of embodiments 3 to 19, wherein the stream depleted in propylene obtained according to (v) comprise in the range of from 40 to 98 weight-%, preferably in the range of from 60 to 95 weight-%, more preferably in the range of from 70 to 90 weight-% of light-boiling compounds, based on the total weight of the stream.
21. The process of any one of embodiments 1 to 20, wherein the stream which is depleted in light-boiling compounds obtained according to (v) is used for cooling in (iii.2), wherein a liquid stream comprising propylene is obtained from (iii.2), which is further depleted in light-boiling compounds compared to the stream comprising propylene obtained in (v), which is used for cooling in (iii.2), wherein preferably the liquid stream obtained from (iii.2) comprises at least 1, preferably at least 2 weight-%, more preferably at least 3 weight-%, more preferably at least 4 weight-%, more preferably at least 5 weight-% less light-boiling compounds than the stream obtained according to (v), each based on the total weight of the liquid stream obtained from (iii.2).
22. The process of embodiment 21, wherein the liquid stream comprising propylene obtained from (iii.2) comprises in the range of from 70 to 100 weight-%, preferably in the range of from 75 to 98 weight-%, more preferably in the range of from 85 to 95 weight-% of the propylene in the stream obtained according to (v).
23. The process of embodiment 21 or 22, wherein the liquid stream comprising propylene obtained from (iii.2) comprises in the range of from 50 to 90 weight-%, preferably in the range of from 60 to 80 weight-%, more preferably in the range of from 65 to 75 weight-% of propylene, based on the total weight of the liquid stream.

24. The process of any one of embodiments 21 to 23, wherein the liquid stream comprising propylene obtained from (iii.2) comprises in the range of from 10 to 50 weight-%, preferably in the range of from 20 to 40 weight-%, more preferably in the range of from 25 to 35 weight-% of light-boiling compounds, based on the total weight of the liquid stream.

25. The process of any one of embodiments 21 to 24, wherein a gaseous stream is obtained from (iii.2), which is enriched in light-boiling compounds compared to the stream comprising propylene obtained in (v), which is used for cooling in (iii.2), wherein preferably the gaseous stream obtained from (iii.2) comprises at least 5, preferably at least 10 weight-%, more preferably at least 15 weight-%, more preferably at least 20 weight-%, more preferably at least 30 weight-% more light-boiling compounds than the stream obtained according to (v), each based on the total weight of the gaseous stream obtained from (iii.2).

26. The process of embodiment 25, wherein the gaseous stream obtained from (iii.2) comprises in the range of from 50 to 90 weight-%, preferably in the range of from 60 to 85 weight-%, in the range of from 62 to 85 weight-% of light-boiling compounds, based on the total weight of the gaseous stream.

27. The process of embodiment 25 or 26, wherein the gaseous stream obtained from (iii.2) comprises in the range of from 10 to 50 weight-%, preferably in the range of from 15 to 40 weight-%, more preferably in the range of from 15 to 38 weight-% of propylene, based on the total weight of the gaseous stream.

28. The process of any one of embodiments 1 to 27, wherein the cooling medium stream comprises propylene, wherein preferably at least 90 weight-%, preferably at least 95 weight-%, more preferably at least 98 weight-%, more preferably at least 99 weight-% of the cooling medium stream provided according to (ii) consists of propylene, based on the total weight of the cooling medium stream.

29. The process of any one of embodiments 1 to 28, wherein the stream comprising propylene and a light-boiling compound provided according to (i) is a downstream process stream from an epoxidation process, wherein a feed stream comprising propylene and propane is reacted with hydrogen peroxide in an aqueous organic solvent mixture in the presence of an epoxidation catalyst, thereby obtaining a stream comprising propylene, propane, propylene oxide, water, and organic solvent; wherein downstream of said epoxidation process a stream S1 comprising propylene, propane, and a light-boiling compound is introduced into a distillation unit and subjected to distillation conditions in said distillation unit, thereby obtaining a side stream S2, which is enriched in propylene compared to S1, a bottoms stream S3, which is enriched in propane compared to S1, and a gaseous top stream S4 comprising propylene and a light-boiling compound, wherein S4 represents the stream comprising propylene and a light-boiling compound provided according to (i).

30. The process of any one of embodiments 1 to 29, wherein the at least partially liquid stream comprising propylene obtained in (v), which is depleted in light-boiling compounds according to any one of embodiments 1 to 20, and/or the liquid stream comprising propylene obtained from (iii.2) according to any one of embodiments 21 to 25, each optionally after one or more work-up steps, is used as a feed stream for preparing the stream comprising propylene and a light-boiling compound provided in (i) and/or is used as part of a feed stream for the epoxidation process.

31. The process of any one of embodiments 1 to 30, wherein the cooling medium stream comprises propylene and the cooling medium stream having a temperature $T_6$ according to any one of embodiments 1 to 7, and/or the cooling medium stream having temperature $T_7$ according to any one of embodiments 1 to 5, optionally after one or more work-up steps, is used as a feed stream for preparing the stream comprising propylene and a light-boiling compound provided in (i) and/or is used as part of a feed stream for the epoxidation process.

32. A process for the preparation of propylene oxide comprising:
 (a) providing a reaction mixture comprising propylene, water, organic solvent, and hydrogen peroxide;
 (b) contacting the reaction mixture provided in (a) in an epoxidation zone with an epoxidation catalyst comprising a zeolitic material having a framework structure comprising Si, O, and Ti, and subjecting the reaction mixture to epoxidation reaction conditions in the epoxidation zone, obtaining, in the epoxidation zone, a mixture comprising propylene oxide, water, and organic solvent;
 (c) removing an effluent stream from the epoxidation zone, the effluent stream comprising propylene oxide, water, and organic solvent;
 wherein the at least partially liquid stream comprising propylene obtained in (v), which is depleted in light-boiling compounds according to any one of embodiments 1 to 20, and/or the liquid stream comprising propylene obtained from (iii.2) according to any one of embodiments 21 to 25, and/or the cooling medium stream having a temperature $T_6$ according to any one of embodiments 1 to 7 and/or the cooling medium stream having temperature $T_7$ according to any one of embodiments 1 to 5, each optionally after one or more work-up steps, is used as a propylene feed stream for preparing the reaction mixture provided according to (a).

33. The process for the preparation of propylene oxide of embodiment 32, wherein the epoxidation catalyst comprises a zeolitic material having a framework structure comprising Si, O, and Ti.

34. The process for the preparation of propylene oxide of embodiment 32 or 33, wherein the zeolitic material comprises Ti in an amount in the range of from 0.2 to 5 weight-%, preferably in the range of from 0.5 to 4 weight-%, more preferably in the range of from 1.0 to 3 weight-%, more preferably in the range of from 1.2 to 2.5 weight-%, more preferably in the range of from 1.4 to 2.2 weight-%, calculated as elemental Ti and based on the total weight of the zeolitic material.

35. The process for the preparation of propylene oxide of any one of embodiments 32 to 34, wherein the zeolitic material having a framework structure comprising Si, O, and Ti comprised in the epoxidation catalyst is a titanium zeolite having ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, CDO, CFI, CGF, CGS, CHA, CHI, CLO, CON, CZP, DAC, DDR, DFO, DFT, DOH, DON, EAB, EDI, EMT, EPI, ERI, ESV, ETR, EUO, FAU, FER, FRA, GIS, GIU, GME, GON, GOO, HEU, IFR, ISV, ITE, ITH, ITQ, ITW, IWR, IWW, JBW, KFI, LAU, LEV, LIO, LOS, LOV, LTA, LTL, LTN, MAR, MAZ, MCM-22 (S), MCM-36, MCM-56, MEI, MEL, MEP, MER, MIT-1, MMFI, MFS, MON, MOR, MSE, MSO, MTF, MTN, MTT, MTW, MWW, NAB, NAT, NEES, NON, NPO, OBW, OFF, OSI, OSO, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN SFO, SGT, SOD, SSY, STF, STI, STT, TER, THO, TON, TSC, UEI, UFI, UOZ, USI, UTL, VET, VFI, VNI, VSV, WEI, WEN, YUG, ZON SVR, SVY framework structure or a mixed structure of two or more of these framework types; more preferably the zeolitic material having a framework structure comprising Si, O, and Ti is a titanium zeolite having an MFI framework type, an MEL framework type, an MWW framework type, an MCM-22 (S) framework type, an MCM-56 framework type, an IEZ-MWW framework type, an MCM-36 framework type, an ITQ framework type, a BEA framework type, a MOR framework type, or a mixed structure of two or more of these framework types; more preferably an MFI framework type, or an MWW framework type; more preferably the zeolitic material having a framework structure comprising Si, O, and Ti has framework type MFI; more preferably the zeolitic material having a framework structure comprising Si, O, and Ti is a titanium silicalite-1 (TS-1).

36. The process for the preparation of propylene oxide of any one of embodiments 32 to 35, wherein the epoxidation catalyst further comprises a binder.

37. The process for the preparation of propylene oxide of embodiment 36, wherein the epoxidation catalyst is in the form of a molding, preferably in the form of an extrudate or a granule.

38. The process for the preparation of propylene oxide of embodiment 36 or 37, wherein from 95 to 100 weight-%, preferably from 98 to 100 weight-%, more preferably from 99 to 100 weight-%, more preferably from 99.5 to 100 weight-%, more preferably from 99.9 to 100 weight-% of the molding consist of the zeolitic material and the binder.

39. The process for the preparation of propylene oxide of any one of embodiments 36 to 38, wherein from 95 to 100 weight-%, preferably from 98 to 100 weight-%, more preferably from 99 to 100 weight-%, more preferably from 99.5 to 100 weight-%, more preferably from 99.9 to 100 weight-% of the binder comprised in the molding consist of Si and O.

40. The process for the preparation of propylene oxide of embodiment 39, wherein the epoxidation catalyst, preferably the molding, comprises the binder, calculated as $SiO_2$, in an amount in the range of from 2 to 90 weight-%, preferably in the range of from 5 to 70 weight-%, more preferably in the range of from 10 to 50 weight-%, more preferably in the range of from 15 to 30 weight-%, more preferably in the range of from 20 to 25 weight-%, based on the total weight of the epoxidation catalyst, preferably based on the total weight of the molding and/or wherein the epoxidation catalyst, preferably the molding, comprises the zeolitic material in an amount in the range of from 10 to 98 weight-%, preferably in the range of from 30 to 95 weight-%, more preferably in the in the range of from 50 to 90 weight-%, more preferably in the range of from 70 to 85 weight-%, more preferably in the range of from 75 to 80 weight-%, based on the total weight of the epoxidation catalyst, preferably based on the total weight of the molding.

41. The process for the preparation of propylene oxide of any one of embodiments 32 to 40, wherein the hydrogen peroxide is provided as aqueous hydrogen peroxide solution, which preferably has a total organic carbon content (TOC) in the range of from 100 to 800 mg per kg hydrogen peroxide comprised in the aqueous hydrogen peroxide solution, preferably in the range of from 120 to 750 mg per kg hydrogen peroxide comprised in the aqueous hydrogen peroxide solution, more preferably in the range of from 150 to 700 mg per kg hydrogen peroxide comprised in the aqueous hydrogen peroxide solution, determined according to DIN EN 1484 (April 2019).

42. The process for the preparation of propylene oxide of any one of embodiments 32 to 41, wherein the hydrogen peroxide has a pH in the range of from 0 to 3.0, preferably in the range of from 0.1 to 2.5, more preferably in the range of from 0.5 to 2.3, determined with a pH sensitive glass electrode according to CEFIC PEROXYGENS H2O2 AM-7160 standard (2003).

43. The process for the preparation of propylene oxide of any one of embodiments 32 to 42, wherein the hydrogen peroxide comprises from 20 to 85 weight-%, preferably from 30 to 75 weight-%, more preferably from 40 to 70 weight-% of hydrogen peroxide, relative to the total weight of the aqueous hydrogen peroxide solution.

44. The process for the preparation of propylene oxide of any one of embodiments 32 to 43, wherein the hydrogen peroxide is obtained or obtainable from an anthraquinone process.

45. The process for the preparation of propylene oxide of any one of embodiments 32 to 44, wherein the organic solvent is an organic epoxidation solvent, preferably the organic solvent is selected from the group consisting of alcohol, acetonitrile, propionitrile and mixtures of two or more thereof; more preferably selected from the group consisting of alcohol, acetonitrile and mixtures of alcohol and acetonitrile; more preferably the organic solvent comprises at least an alcohol, wherein the alcohol is preferably a C1 to C5 mono alcohol or a mixture of two or more C1 to C5 alcohols, more preferably the alcohol comprises at least methanol.

46 The process for the preparation of propylene oxide of any one of embodiments 32 to 45, wherein the reaction mixture provided in (a) comprises an additive, wherein the additive is preferably selected from the group consisting of potassium salt, ammonia, ammonium salt, etidronic acid, salt of etidronic acid, and mixtures of two or more thereof, more preferably selected from the group consisting of potassium dihydrogen phosphate, dipotassium hydrogen phosphate, potassium formate, potassium acetate, potassium hydrogen carbonate, etidronic acid, ammonium dihydrogen phosphate, diammonium hydrogen phosphate, ammonia and mixtures of two or more thereof, preferably from the group consisting of potassium dihydrogen phosphate, dipotassium hydrogen phosphate, etidronic acid, ammonia and mixtures of two or more thereof, wherein the additive more preferably comprises at least dipotassium hydrogen phosphate.

47. The process for the preparation of propylene oxide of any one of embodiments 32 to 46, wherein the contacting under epoxidation reaction conditions in the epoxidation zone with the epoxidation catalyst in (b) is carried out at an absolute pressure in the epoxidation zone in the range of from 5 to 50 bar (abs.), preferably in the range of from 15 to 30 bar (abs.), more preferably in the range of from 18 to 28 bar (abs.).

48. The process for the preparation of propylene oxide of any one of embodiments 32 to 47, wherein the contacting under epoxidation reaction conditions in the epoxidation zone with the epoxidation catalyst in (b) is carried out at a temperature in the epoxidation zone in the range of from 20 to 75° C., more preferably in the range of from 25 to 75° C., preferably in the range of from 28 to 70° C., more preferably in the range of from 30 to 65° C.

49. The process for the preparation of propylene oxide of any one of embodiments 32 to 48, wherein the epoxidation reaction conditions comprise trickle bed conditions.

50. The process for the preparation of propylene oxide of any one of embodiments 32 to 49, wherein the epoxidation reaction conditions comprise fixed bed conditions.

The present invention is further illustrated by the following reference Examples, comparative Examples, and Examples.

EXAMPLES

Simulations

All simulations were done with the process simulation software ASPEN PLUS™ v. 8.6. The components used in the process simulation and their characteristics respectively, were taken from the ASPEN PLUS™ v. 8.6 PURE32 Database.

Abbreviations

The expression "Phase" in Tables 1 to 6 means the phase condition of a stream, i.e. whether the respective stream is vapor (gaseous) or liquid. The expression "deltaT min." in Tables 1 to 6 means the minimum temperature difference at the terminal ends of a heat exchanger. The expression "dewpoint" means the respective water dewpoint temperature.

Reference Example 1: Drying and Condensation of a Gaseous Vent Stream Obtained From a Propylene-Propane Distillation Unit A gaseous vent stream P1 obtained from a propylene-propane distillation unit downstream of a process for epoxidation of propylene to propylene oxide had been calculated with the ASPEN PLUS™ process simulator of Aspen Technology, Inc. Computed compound flowrates and related parameters of stream P1 were depicted in table 1.

Stream P1 was comprised of about 52.5 weight-% propylene, 1.3 weight-% propane and 640 weight-ppm water, each based on the total weight of stream P1. The balance to 100 weight-% was comprised of light-boiling compounds, with carbon dioxide being the predominant light-boiling compound having a concentration of 29.5 weight-% based on the total weight of stream P1. Light-boiling compounds entered the epoxidation process either as a raw material stream, as impurities of a raw material stream, or were generated as byproducts of the epoxidation process. Stream P1 was the primary outlet stream for light-boiling compounds from the epoxidation process and this stream was usually being fed to an incineration unit. In case stream P1 was incinerated the propylene contained in this stream was lost as raw material of the epoxidation process. To recover at least part of the propylene contained in stream P1 for reuse as raw material of the epoxidation process calculations were performed to evaluate the suitability of low temperature condensation of stream P1 to reclaim propylene from being incinerated as a condensed liquid stream. Preferably this condensed liquid stream was depleted in light-boiling compounds, because this liquid stream was to be recycled back to the epoxidation process. In the context low temperature condensation was to be understood as a condensation process that ended with a temperature substantially below the freezing temperature of water. Stream P1 contained a certain amount of water. The fraction of water in stream P1 varied with the process conditions upstream of the propylene-propane distillation unit, from where this stream was obtained. Prior to executing low temperature condensation of stream P1, water had to be removed from this stream in order to reduce the partial pressure of water contained in stream P1. Thus, a water dewpoint temperature of stream P1 was required that was, by a certain safety margin, below the intended condensation temperature of stream P1. This avoided water freezing issues when low temperature condensation was executed. To accomplish water removal from stream P1, i.e. for "drying" stream P1, a drying unit D was used as shown in FIG. 1. Most suitably this drying unit was operated at about the pressure and temperature of stream P1, because the conditions of stream P1, i.e. elevated pressure and comparatively low temperature, were in favor of water adsorption on any kind of adsorbent material. A gaseous stream P2 depleted in water was obtained as outlet stream of the drying unit D. Stream P2 was conditioned to being directly fed to the low temperature condensing unit E-1. Usually the 10° C. temperature level was the lowest utility temperature level available for the epoxidation process. This level was insufficient to execute the intended low temperature condensation of stream P2 down to a temperature of −40° C. as in case of present Reference Example 1. For heat exchange between a process stream and a utility stream a certain temperature difference was needed. In case of Reference Example 1 a utility temperature of say −45° C. was considered to be sufficient to execute the low temperature condensation of stream P2 ending at −40° C. An epoxidation process, from which stream P1 was obtained, had two main raw material feed streams, a feed stream of hydrogen peroxide in aqueous solution, and a liquid propylene feed stream. Typical liquid propylene supply specifications documented water contents of 10 wt-ppm or less, based on the total weight of the liquid propylene supply. Water concentrations of such values were equivalent to dew point temperatures of liquid propylene streams below −45° C. at about atmospheric pressure. Based on an evaluation of the specification values of the water content in liquid propylene streams in combination with the vapor pressure curve of propylene, the low temperature utility for use in condensing unit E-1 was identified.

The liquid propylene feed stream to the epoxidation process was a suitable and the preferred liquid cooling medium stream to be used for low temperature condensation in condensing unit E-1.

To execute low temperature condensation in condensing unit E-1 a small stream C1 of liquid propylene, taken off the main feed stream of liquid propylene to the epoxidation process, was applied as liquid cooling medium stream. For that purpose stream C1 was being fed to condensing unit E-1, flashed down and, ideally, was completely evaporated within the second zone of condensing unit E-1 at, as in case of present Reference Example 1, 1.15 bar absolute pressure and a temperature of about −45° C. Thus a gaseous stream C5 was obtained from the second zone of condensing unit E-1. In the first zone of condensing unit E-1 stream P2 was partially condensed down to a temperature of about −40° C. Thus a gaseous stream P3, which was depleted in propylene, and a liquid stream P4, which was depleted in light-boiling compounds, were obtained. The first zone of condensing unit E-1 was operated at about the feed pressure of stream P2 reduced by the pressure drop typical for commercial heat exchanger designs. The second zone of condensing unit E-1, which may be operated at sub-atmospheric, atmospheric or above atmospheric pressure, was operated at a pressure just slightly above atmospheric pressure for numerous reasons. In case the second zone of condensing unit E-1 was operated at sub-atmospheric pressure the possibility of leak air intrusion existed, which was a potential process hazard due to the flammability of propylene. If the pressure in the second zone of condensing unit E-1 would be operated too low, freezing of carbon dioxide would be possible. In case of operating the second zone of condensing unit E-1 at pressures substantially above atmospheric pressure the condensation temperature in the first zone of condensing unit E-1 would increase accordingly, thus diminishing propylene recovery achieved by stream P4. Table 1 provides a summary of calculated results for the heat and material balance according to present Reference Example 1 and based on the configuration shown in FIG. 1.

been recovered with stream P4. Table 1 depicted further, that gaseous stream P3 was depleted in propylene, whereas liquid stream P4 was depleted in light-boiling compounds, compared to stream P1. Stream P4 and stream C5, optionally after one or more workup steps, were recycled back to the epoxidation process as makeup streams of the main liquid propylene feed stream of the epoxidation process. In view of the recycling of stream C5 back to the epoxidation process as makeup stream of the main liquid propylene feed stream of the epoxidation process, it would be advantageous to keep the mass flowrate required for stream C1 as low as possible.

Comparative Example 1: Drying and Condensation of a Gaseous Vent Stream Obtained From a Propylene-Propane Distillation Unit as Described in Reference Example 1. Re-Heating of the Gaseous Stream Obtained From the Condensing Unit by Pre-Cooling the Liquid Cooling Medium Stream Proceeding from the configuration as shown in FIG. 1, a heat exchanger E-2 had been added to result in the configuration as shown in FIG. 2. All parameters from Reference Example 1, that were not impacted by the addition of heat exchanger E-2, were retained for Comparative Example 1. Thus, it was to be noticed, that streams P1, P2, P3 and P4 from Reference Example 1 as well as the operating parameters of drying unit D and condensing unit E-1 were retained for Comparative Example 1. The calculations of Reference

TABLE 1

Calculation results for gaseous vent stream drying and condensing by evaporating a liquid cooling medium stream according to Reference Example 1 and based on the configuration shown in FIG. 1.

| Stream | | P1 | P2 | P3 | P4 | C1 | C5 |
|---|---|---|---|---|---|---|---|
| Pressure | bar(abs.) | 24.4 | 24.2 | 24.0 | 24.0 | 26.5 | 1.15 |
| Temperature | ° C. | 15.2 | 15.0 | −40.0 | −40.0 | 35.0 | −45.0 |
| Phase | — | Vapor | Vapor | Vapor | Liquid | Liquid | Vapor |
| Hydrogen | kg/h | 2.6190 | 2.6190 | 2.5637 | 0.0553 | | |
| Nitrogen | kg/h | 0.5775 | 0.5775 | 0.5382 | 0.0393 | | |
| Oxygen | kg/h | 3.2490 | 3.2490 | 2.8307 | 0.4183 | | |
| CO | kg/h | 2.5125 | 2.5125 | 2.3065 | 0.2060 | | |
| $CO_2$ | kg/h | 44.2455 | 44.2455 | 15.0289 | 29.2166 | | |
| Methane | kg/h | 1.8045 | 1.8045 | 1.3587 | 0.4458 | 0.0116 | 0.0116 |
| Ethane | kg/h | 14.1840 | 14.1840 | 3.4148 | 10.7692 | 0.0232 | 0.0232 |
| Propylene | kg/h | 78.7035 | 78.7035 | 4.4915 | 74.2120 | 230.5992 | 230.5992 |
| Propane | kg/h | 2.0085 | 2.0085 | 0.1098 | 1.8987 | 1.1240 | 1.1240 |
| Water | kg/h | 0.0960 | $2.6 \cdot 10^{-4}$ | $0.1 \cdot 10^{-4}$ | $2.5 \cdot 10^{-4}$ | | |
| Total Flow | kg/h | 150.0000 | 149.9043 | 32.6428 | 117.2615 | 231.7580 | 231.7580 |
| Dewpoint | ° C. | | <−45 | | | | |
| Propylene recovered | | | | | 94.3% | | |
| E-1 Duty | kW | | | | | | 15.3348 |
| E-1 deltaT min. | K | | | | | | 5.0 |

For the condensation according to the parameters of Reference Example 1 and the configuration as shown in FIG. 1, a heat duty of about 15.3 kW for condensing unit E-1 was calculated. This heat duty was transferred to the liquid cooling medium stream C1. Stream C1 had a calculated mass flowrate of about 232 kg/h in case of complete evaporation of stream C1 in condensing unit E-1 yielding stream C5. For the operating temperatures of Reference Example 1 the minimum temperature difference evaluated at the terminal ends of condensing unit E-1 was 5 K. The calculation results depicted in table 1 demonstrated that about 94% of the propylene contained in the gaseous vent stream P1, obtained from the propylene-propane distillation unit, had Example 1 were repeated in order to evaluate the impact of pre-cooling the liquid cooling medium stream C1 by re-heating the gaseous stream P3, obtained from condensing unit E-1. Both zones of heat exchanger E-2 were assumed to operate at about the feed pressures of stream P3 and stream C1 respectively, reduced by the pressure drops typical for commercial heat exchanger designs. The minimum temperature difference to be achieved at the terminal ends of heat exchanger E-2 by calculation was defined to be 5 K. Table 2 provides a summary of calculated results for the heat and material balance according to Comparative Example 1 and the configuration shown in FIG. 2.

TABLE 2

Calculated results for gaseous vent stream drying and condensing by evaporating a liquid cooling medium stream according to Comparative Example 1 and the configuration shown in FIG. 2.

| Stream | | P1 | P2 | P3 | P4 | P5 | C1 | C2 | C5 |
|---|---|---|---|---|---|---|---|---|---|
| Pressure | bar(abs.) | 24.4 | 24.2 | 24.0 | 24.0 | 23.9 | 26.5 | 26.2 | 1.15 |
| Temperature | ° C. | 15.2 | 15.0 | −40.0 | −40.0 | 30.0 | 35.0 | 20.5 | −45.0 |
| Phase | — | Vapor | Vapor | Vapor | Liquid | Vapor | Liquid | Liquid | Vapor |
| Hydrogen | kg/h | 2.6190 | 2.6190 | 2.5637 | 0.0553 | 2.5637 | | | |
| Nitrogen | kg/h | 0.5775 | 0.5775 | 0.5382 | 0.0393 | 0.5382 | | | |
| Oxygen | kg/h | 3.2490 | 3.2490 | 2.8307 | 0.4183 | 2.8307 | | | |
| CO | kg/h | 2.5125 | 2.5125 | 2.3065 | 0.2060 | 2.3065 | | | |
| CO$_2$ | kg/h | 44.2455 | 44.2455 | 15.0289 | 29.2166 | 15.0289 | | | |
| Methane | kg/h | 1.8045 | 1.8045 | 1.3587 | 0.4458 | 1.3587 | 0.0100 | 0.0100 | 0.0100 |
| Ethane | kg/h | 14.1840 | 14.1840 | 3.4148 | 10.7692 | 3.4148 | 0.0200 | 0.0200 | 0.0200 |
| Propylene | kg/h | 78.7035 | 78.7035 | 4.4915 | 74.2120 | 4.4915 | 198.0674 | 198.0674 | 198.0674 |
| Propane | kg/h | 2.0085 | 2.0085 | 0.1098 | 1.8987 | 0.1098 | 0.9655 | 0.9655 | 0.9655 |
| Water | kg/h | 0.0960 | 2.6 · 10$^{-4}$ | 0.1 · 10$^{-4}$ | 2.5 · 10$^{-4}$ | 0.1 · 10$^{-4}$ | | | |
| Total Flow | kg/h | 150.0000 | 149.9043 | 32.6428 | 117.2615 | 32.6428 | 199.0629 | 199.0629 | 199.0629 |
| Dewpoint | ° C. | | <−45 | | | | | | |
| Propylene recovered | | | | | | 94.3% | | | |
| E-1 Duty | kW | | | | | | | | 15.3348 |
| E-1 deltaT min. | K | | | | | | | | 5.0 |
| E-2 Duty | kW | | | | | | | 1.4179 | |
| E-2 deltaT min. | K | | | | | | | 5.0 | |

For the heat exchange between stream P3 and stream C1 according to the parameters of Comparative Example 1 and the configuration as shown in FIG. 2 a heat duty of about 1.4 kW for heat exchanger E-2 was calculated. The calculated outlet temperature of stream P5 was 30° C., which was an increase of 70° C. compared to the inlet temperature of stream P3.

The heat duty of about 1.4 kW was transferred to the liquid cooling medium inlet stream C1, yielding an outlet stream C2 having a temperature of 20.5° C. The calculation results for Comparative Example 1 demonstrated that, by adding heat exchanger E-2, stream C1 now had a calculated mass flowrate of about 199 kg/h compared to about 232 kg/h in case of Reference Example 1. This represented a flowrate reduction of about 14% compared to the results obtained for Reference Example 1 at the same propylene recovery performance according to the configuration as shown in FIG. 1. Stream P4 and stream C5, optionally after one or more workup steps, were recycled back to the epoxidation process as makeup streams of the main liquid propylene feed stream of the epoxidation process.

Example 1: Drying and Condensation of a Gaseous Vent Stream Obtained From a Propylene-Propane Distillation Unit as Described in Reference Example 1—Re-Heating of the Gaseous Stream Obtained From the Condensing Unit as Described in Comparative Example 1—Partial Re-Evaporation of the Condensate Stream Obtained From the Condensing Unit by Pre-Cooling the Liquid Cooling Medium Stream Further Proceeding from the configuration as shown in FIG. 2 heat exchanger E-3 had been added to yield the configuration as shown in FIG. 3. All parameters from Reference Example 1 and Comparative Example 1, that were not impacted by the addition of heat exchanger E-3, were retained for Example 1. Thus, it was to be noticed, that streams P1, P2, P3, P4 and P5 from Reference Example 1 and Comparative Example 1 have exactly been retained for Example 1. The calculations of Comparative Example 1 were repeated in order to evaluate the impact of pre-cooling the liquid cooling medium stream C2 further by partially re-evaporating the condensate stream P4, obtained from condensing unit E-1. The operating pressure of the low temperature zone of heat exchanger E-3 had been set to 17.5 bar (abs.). This pressure had been selected to enable sufficient re-evaporation of stream P4 in order to partially dissolve light-boiling compounds contained in liquid stream P4. Such dissolved light-boiling compounds, optionally after one or more workup steps, were recycled back to the propylene-propane distillation unit. The high temperature zone of heat exchanger E-3 was assumed to operate at about the feed pressure of stream C2, reduced by the pressure drop typical for commercial heat exchanger designs. The minimum temperature difference to be achieved at the terminal ends of heat exchanger E-3 by calculation was defined to be 2.5 K. Table 3 provides a summary of calculated results for the heat and material balance according to Example 1 and the configuration as shown in FIG. 3.

TABLE 3

Calculated results for gaseous vent stream drying and condensing by evaporating a liquid cooling medium stream according to Example 1 and the configuration as shown in FIG. 3.

| Stream | | P1 | P2 | P3 | P4 | P5 | P6L |
|---|---|---|---|---|---|---|---|
| Pressure | bar(abs.) | 24.4 | 24.2 | 24.0 | 24.0 | 23.9 | 17.5 |
| Temperature | ° C. | 15.2 | 15.0 | −40.0 | −40.0 | 30.0 | 2.0 |
| Phase | — | Vapor | Vapor | Vapor | Liquid | Vapor | Liquid |

TABLE 3-continued

Calculated results for gaseous vent stream drying and condensing by evaporating a liquid cooling medium stream according to Example 1 and the configuration as shown in FIG. 3.

| | | | | | | | |
|---|---|---|---|---|---|---|---|
| Hydrogen | kg/h | 2.6190 | 2.6190 | 2.5637 | 0.0553 | 2.5637 | 0.0043 |
| Nitrogen | kg/h | 0.5775 | 0.5775 | 0.5382 | 0.0393 | 0.5382 | 0.0058 |
| Oxygen | kg/h | 3.2490 | 3.2490 | 2.8307 | 0.4183 | 2.8307 | 0.0924 |
| CO | kg/h | 2.5125 | 2.5125 | 2.3065 | 0.2060 | 2.3065 | 0.0353 |
| $CO_2$ | kg/h | 44.2455 | 44.2455 | 15.0289 | 29.2166 | 15.0289 | 18.6166 |
| Methane | kg/h | 1.8045 | 1.8045 | 1.3587 | 0.4458 | 1.3587 | 0.1588 |
| Ethane | kg/h | 14.1840 | 14.1840 | 3.4148 | 10.7692 | 3.4148 | 7.9644 |
| Propylene | kg/h | 78.7035 | 78.7035 | 4.4915 | 74.2120 | 4.4915 | 66.8964 |
| Propane | kg/h | 2.0085 | 2.0085 | 0.1098 | 1.8987 | 0.1098 | 1.7237 |
| Water | kg/h | 0.0960 | $2.6 \cdot 10^{-4}$ | $0.1 \cdot 10^{-4}$ | $2.5 \cdot 10^{-4}$ | $0.1 \cdot 10^{-4}$ | $1.8 \cdot 10^{-4}$ |
| | | | | | | | |
| Total Flow | kg/h | 150.0000 | 149.9043 | 32.6428 | 117.2615 | 32.6428 | 95.4979 |
| Dewpoint | ° C. | | <-45 | | | | |
| Propylene recovered | | | | | 94.3% | | |
| E-1 Duty | kW | | | | | | |
| E-1 deltaT min. | K | | | | | | |
| E-2 Duty | kW | | | | | | |
| E-2 deltaT min. | K | | | | | | |
| E-3 Duty | kW | | | | | | |
| E-3 deltaT min. | K | | | | | | |

| Stream | | P6V | C1 | C2 | C3 | C5 |
|---|---|---|---|---|---|---|
| Pressure | bar(abs.) | 17.5 | 26.5 | 26.2 | 25.9 | 1.15 |
| Temperature | ° C. | 2.0 | 35.0 | 20.5 | -37.5 | -45.0 |
| Phase | — | Vapor | Liquid | Liquid | Liquid | Vapor |
| Hydrogen | kg/h | 0.0510 | | | | |
| Nitrogen | kg/h | 0.0335 | | | | |
| Oxygen | kg/h | 0.3259 | | | | |
| CO | kg/h | 0.1707 | | | | |
| $CO_2$ | kg/h | 10.6000 | | | | |
| Methane | kg/h | 0.2870 | 0.0066 | 0.0066 | 0.0066 | 0.0066 |
| Ethane | kg/h | 2.8048 | 0.0132 | 0.0132 | 0.0132 | 0.0132 |
| Propylene | kg/h | 7.3156 | 131.9278 | 131.9278 | 131.9278 | 131.9278 |
| Propane | kg/h | 0.1750 | 0.6431 | 0.6431 | 0.6431 | 0.6431 |
| Water | kg/h | $0.7 \cdot 10^{-4}$ | | | | |
| | | | | | | |
| Total Flow | kg/h | 21.7636 | 132.5907 | 132.5907 | 132.5907 | 132.5907 |
| Dewpoint | ° C. | | | | | |
| Propylene recovered | | | | | | |
| E-1 Duty | kW | | | | | 15.3348 |
| E-1 deltaT min. | K | | | | | 5.0 |
| E-2 Duty | kW | | | 1.4179 | | |
| E-2 deltaT min. | K | | | 5.0 | | |
| E-3 Duty | kW | | | | 5.0387 | |
| E-3 deltaT min. | K | | | | 2.5 | |

For the heat exchange between stream P4 and stream C2 according to the parameters of Example 1 and the configuration as shown in FIG. 3 a heat duty of about 5.0 kW for heat exchanger E-3 was calculated. By this heat exchange stream P4 was partially evaporated ending at a temperature of 2° C. This partial evaporation yielded a liquid outlet stream P6L having a calculated mass flowrate of about 95.5 kg/h. Stream P6L contained about 28 weight-% of light-boiling compounds, compared to about 35 weight-% of such compounds in stream P4. Stream P6L was comprised of about 90% of the propylene contained in stream P4 and was, optionally after one or more workup steps, recycled back to the epoxidation process as makeup stream of the main liquid propylene feed stream. Further, a vapor outlet stream P6V having a calculated mass flowrate of about 21.8 kg/h was obtained. Stream P6V contained about 66 weight-% of light-boiling compounds, compared to about 35 weight-% of such compounds in stream P4. This demonstrated, that the partial re-evaporation of stream P4 in heat exchanger E-3 had dissolved light-boiling compounds contained in liquid stream P4. Stream P6V was, optionally after one or more workup steps, recycled back to the propylene-propane distillation unit to recover the propylene content of this stream.

The heat duty of about 5.0 KW was transferred to the liquid cooling medium inlet stream C2, obtaining an outlet stream C3 having a temperature of -37.5° C. The calculation results for Example 1 demonstrated that, by adding heat exchanger E-3, the calculated mass flowrate of stream C1 was further reduced to about 133 kg/h compared to about 232 kg/h in case of Reference Example 1. This represents a flowrate reduction of about 43% compared to the results obtained for Reference Example 1 at the same propylene recovery performance according to the configuration as shown in FIG. 1. Stream C5, optionally after one or more workup steps, was recycled back to the epoxidation process as makeup stream of the main liquid propylene feed stream of the epoxidation process.

Example 2: Drying and Condensation of a Gaseous Vent Stream Obtained From a Propylene-Propane Distillation Unit as Described in Reference Example 1—Re-Heating of the Gaseous Stream Obtained From the Condensing Unit as Described in Comparative Example 1—Partial Re-Evaporation of the Condensate Stream Obtained From the Condensing Unit by Pre-Cooling the Liquid Cooling Medium Stream Further as Described in Example 1—Even Further Pre-Cooling of the Liquid Cooling Medium Stream by Re-Heating the Evaporated Cooling Medium Stream From the Condensing Unit Proceeding from the configuration as shown in FIG. 3 heat exchanger E-4 had been added to yield the configuration as shown in FIG. 4. All parameters from Reference Example 1, Comparative Example 1 and Example 1, that were not impacted by the addition of heat exchanger E-4, were retained for Example 2. Thus, it was to be noticed, that streams P1, P2, P3, P4, P5, P6L and P6V from Reference Example 1, Comparative Example 1 and Example 1 have exactly been retained for Example 2. The calculations of Example 1 were repeated in order to evaluate the impact of pre-cooling the liquid cooling medium stream C3 even further by re-heating the evaporated cooling medium stream obtained from condensing unit E-1. Both zones of heat exchanger E-4 were assumed to operate at about the feed pressures of stream C3 and stream C5 respectively, reduced by the pressure drops typical for commercial heat exchanger designs.

The minimum temperature difference to be achieved at the terminal ends of heat exchanger E-4 by calculation was defined to be 2.5 K. Table 4 provides a summary of calculated results for the heat and material balance according to Example 2 and the configuration as shown in FIG. 4.

TABLE 4

Calculated results for gaseous vent stream drying and condensing by evaporating a liquid cooling medium stream according to Example 2 and the configuration as shown in FIG. 4.

| Stream | | P1 | P2 | P3 | P4 | P5 | P6L | P6V |
|---|---|---|---|---|---|---|---|---|
| Pressure | bar(abs. | 24.4 | 24.2 | 24.0 | 24.0 | 23.9 | 17.5 | 17.5 |
| Temperature | °C. | 15.2 | 15.0 | −40.0 | −40.0 | 30.0 | 2.0 | 2.0 |
| Phase | — | Vapor | Vapor | Vapor | Liquid | Vapor | Liquid | Vapor |
| Hydrogen | kg/h | 2.6190 | 2.6190 | 2.5637 | 0.0553 | 2.5637 | 0.0043 | 0.0510 |
| Nitrogen | kg/h | 0.5775 | 0.5775 | 0.5382 | 0.0393 | 0.5382 | 0.0058 | 0.0335 |
| Oxygen | kg/h | 3.2490 | 3.2490 | 2.8307 | 0.4183 | 2.8307 | 0.0924 | 0.3259 |
| CO | kg/h | 2.5125 | 2.5125 | 2.3065 | 0.2060 | 2.3065 | 0.0353 | 0.1707 |
| $CO_2$ | kg/h | 44.2455 | 44.2455 | 15.0289 | 29.2166 | 15.0289 | 18.6166 | 10.6000 |
| Methane | kg/h | 1.8045 | 1.8045 | 1.3587 | 0.4458 | 1.3587 | 0.1588 | 0.2870 |
| Ethane | kg/h | 14.1840 | 14.1840 | 3.4148 | 10.7692 | 3.4148 | 7.9644 | 2.8048 |
| Propylene | kg/h | 78.7035 | 78.7035 | 4.4915 | 74.2120 | 4.4915 | 66.8964 | 7.3156 |
| Propane | kg/h | 2.0085 | 2.0085 | 0.1098 | 1.8987 | 0.1098 | 1.7237 | 0.1750 |
| Water | kg/h | 0.0960 | $2.6 \cdot 10^{-4}$ | $0.1 \cdot 10^{-4}$ | $2.5 \cdot 10^{-4}$ | $0.1 \cdot 10^{-4}$ | $1.8 \cdot 10^{-4}$ | $0.7 \cdot 10^{-4}$ |
| Total Flow | kg/h | 150.0000 | 149.9043 | 32.6428 | 117.2615 | 32.6428 | 95.4979 | 21.7636 |
| Dewpoint | °C. | | <−45 | | | | | |
| Propylene recovered | | | | | | 94.3% | | |
| E-1 Duty | kW | | | | | | | |
| E-1 deltaT | K | | | | | | | |
| E-2 Duty | kW | | | | | | | |
| E-2 deltaT | K | | | | | | | |
| E-3 Duty | kW | | | | | | | |
| E-3 deltaT | K | | | | | | | |
| E-4 Duty | kW | | | | | | | |
| E-4 deltaT | K | | | | | | | |

| Stream | | C1 | C2 | C3 | C4 | C5 | C6 |
|---|---|---|---|---|---|---|---|
| Pressure | bar(abs.) | 26.5 | 26.2 | 25.9 | 25.6 | 1.15 | 1.10 |
| Temperature | °C. | 35.0 | 20.5 | −37.5 | −40.5 | −45.0 | −40.0 |
| Phase | — | Liquid | Liquid | Liquid | Liquid | Vapor | Vapor |
| Hydrogen | kg/h | | | | | | |
| Nitrogen | kg/h | | | | | | |
| Oxygen | kg/h | | | | | | |
| CO | kg/h | | | | | | |
| $CO_2$ | kg/h | | | | | | |
| Methane | kg/h | 0.0065 | 0.0065 | 0.0065 | 0.0065 | 0.0065 | 0.0065 |
| Ethane | kg/h | 0.0130 | 0.0130 | 0.0130 | 0.0130 | 0.0130 | 0.0130 |
| Propylene | kg/h | 129.8098 | 129.8098 | 129.8098 | 129.8098 | 129.8098 | 129.8098 |
| Propane | kg/h | 0.6327 | 0.6327 | 0.6327 | 0.6327 | 0.6327 | 0.6327 |
| Water | kg/h | | | | | | |
| Total Flow | kg/h | 130.4620 | 130.4620 | 130.4620 | 130.4620 | 130.4620 | 130.4620 |
| Dewpoint | °C. | | | | | | |
| Propylene recovered | | | | | | | |
| E-1 Duty | kW | | | | | 15.3348 | |
| E-1 deltaT min. | K | | | | | 5.0 | |
| E-2 Duty | kW | | 1.4179 | | | | |
| E-2 deltaT min. | K | | 5.0 | | | | |
| E-3 Duty | kW | | | 5.0387 | | | |
| E-3 deltaT min. | K | | | 2.5 | | | |

TABLE 4-continued

Calculated results for gaseous vent stream drying and condensing by evaporating a liquid
cooling medium stream according to Example 2 and the configuration as shown in FIG. 4.

| E-4 Duty | kW | 0.2462 |
|---|---|---|
| E-4 deltaT min. | K | 2.5 |

For the heat exchange between stream C3 and stream C5 according to the parameters of Example 2 and the configuration as shown in FIG. 4 a heat duty of about 0.25 kW for heat exchanger E-4 was calculated. The calculated outlet temperature of stream C6 was −40° C., which was an increase of 5° C. compared to the inlet temperature of stream C5. The heat duty of about 0.25 KW was transferred to the liquid cooling medium inlet stream C3, obtaining an outlet stream C4 having a temperature of −40.5° C. The calculation results for Example 2 demonstrated that, by adding heat exchanger E-4, the calculated mass flowrate of stream C1 was even further reduced to about 130 kg/h compared to about 232 kg/h in case of Reference Example 1. This represents a flowrate reduction of about 44% compared to the results obtained for Reference Example 1 at the same propylene recovery performance according to the configuration as shown in FIG. 1. Stream P6V was, optionally after one or more workup steps, recycled back to the propylene-propane distillation unit to recover the propylene content of this stream. Stream P6L and stream C6, optionally after one or more workup steps, were recycled back to the epoxidation process as makeup streams of the main liquid propylene feed stream of the epoxidation process. Prior to being used as makeup stream of the main liquid propylene feed stream of the epoxidation process gaseous stream C6 was required to be liquified. For that purpose, gaseous stream C6 was recycled to the suction side of the propylene compressor of the epoxidation process, compressed to a pressure of about 17 bar (abs.) and condensed in a condensing unit, which was operated with cooling water. Therefore, it was of economic benefit to keep the mass flowrate of gaseous stream C6, and consequently, also the mass flowrate of liquid cooling medium stream C1, as small as possible. The calculated mass flowrates of both, liquid cooling medium stream C1 and the gaseous stream C6 obtained from it according to Example 2 and the configuration as shown in FIG. 4 were close to being minimal achievable values obtainable by heat integration of such scheme. Thus Example 2 and the configuration as shown in FIG. 4 represent an economically advantageous solution for the recovery of propylene from gaseous vent streams of epoxidation processes.

Example 3: Drying and Condensation of a Gaseous Vent Stream Obtained From a Propylene-Propane Distillation Unit as Described in Example 2 at Reduced Propylene Content of Such Vent Stream Proceeding from Example 2 and the configuration as shown in FIG. 4 the calculations of Example 2 were repeated to evaluate the impact of a reduced mass flowrate of propylene of stream P1. All compound mass flowrates of stream P1 from Example 2 were retained for Example 3 except for propylene, whose mass flowrate had been reduced from about 78.7 kg/h to about 30.6 kg/h. Thus, for Example 3 a propylene concentration of 30 weight-% in stream P1 had been obtained compared to a propylene concentration of 52.5 weight-% in case of Example 2. According to Example 3 stream P1 was comprised of about 68 weight-% light-boiling compounds, whereas the related value of Example 2 had been about 46 weight-%. The concentrations of all compounds contained in stream P1 except propylene were increased accordingly. Specifically, the water content of stream
P1 had increased to about 940 weight-ppm, compared to 640 weight-ppm in case of Example 2. Parameters of Example 2, that were not impacted by the reduction of the propylene mass flowrate of stream P1, were retained for Example 3 with one exception. The minimum temperature difference to be achieved at the terminal ends of heat exchanger E-3 by calculation had been raised to 5 K compared to 2.5 K in case of Example 2. This had been required to avoid crossing of the heating curve temperatures of stream P4 and of the cooling curve temperatures of stream C2 internal of heat exchanger E-3. Table 5 provides a summary of calculated results for the heat and material balance according to Example 3 and the configuration as shown in FIG. 4.

TABLE 5

Calculated results for gaseous vent stream drying and condensing by evaporating a liquid
cooling medium stream according to Example 3 and the configuration as shown in FIG. 4.

| Stream | | P1 | P2 | P3 | P4 | P5 | P6L | P6V |
|---|---|---|---|---|---|---|---|---|
| Pressure | bar(abs.) | 24.4 | 24.2 | 24.0 | 24.0 | 23.9 | 17.5 | 17.5 |
| Temperature | ° C. | 20.4 | 20.3 | −40.0 | −40.0 | 30.0 | −11.9 | −11.9 |
| Phase | — | Vapor | Vapor | Vapor | Liquid | Vapor | Liquid | Vapor |
| Hydrogen | kg/h | 2.6190 | 2.6190 | 2.5932 | 0.0258 | 2.5932 | 0.0024 | 0.0234 |
| Nitrogen | kg/h | 0.5775 | 0.5775 | 0.5589 | 0.0186 | 0.5589 | 0.0036 | 0.0150 |
| Oxygen | kg/h | 3.2490 | 3.2490 | 3.0445 | 0.2045 | 3.0445 | 0.0595 | 0.1450 |
| CO | kg/h | 2.5125 | 2.5125 | 2.4141 | 0.0984 | 2.4141 | 0.0217 | 0.0767 |
| $CO_2$ | kg/h | 44.2455 | 44.2455 | 23.9293 | 20.3162 | 23.9293 | 15.2084 | 5.1078 |
| Methane | kg/h | 1.8045 | 1.8045 | 1.5840 | 0.2205 | 1.5840 | 0.0971 | 0.1234 |
| Ethane | kg/h | 14.1840 | 14.1840 | 6.2306 | 7.9534 | 6.2306 | 6.5436 | 1.4098 |
| Propylene | kg/h | 30.5555 | 30.5555 | 3.9888 | 26.5667 | 3.9888 | 25.0856 | 1.4811 |
| Propane | kg/h | 2.0085 | 2.0085 | 0.2577 | 1.7508 | 0.2577 | 1.6580 | 0.0928 |
| Water | kg/h | 0.0960 | $2.0 \cdot 10^{-4}$ | $0.2 \cdot 10^{-4}$ | $1.8 \cdot 10^{-4}$ | $0.2 \cdot 10^{-4}$ | $1.6 \cdot 10^{-4}$ | $0.2 \cdot 10^{-4}$ |
| Total Flow | kg/h | 101.8520 | 101.7562 | 44.6011 | 57.1551 | 44.6011 | 48.6801 | 8.4750 |
| Dewpoint | ° C. | | <−45 | | | | | |

TABLE 5-continued

Calculated results for gaseous vent stream drying and condensing by evaporating a liquid cooling medium stream according to Example 3 and the configuration as shown in FIG. 4.

| | | | | | | | |
|---|---|---|---|---|---|---|---|
| Propylene recovered | | | | 86.9% | | | |
| E-1 Duty | kW | | | | | | |
| E-1 deltaT min. | K | | | | | | |
| E-2 Duty | kW | | | | | | |
| E-2 deltaT min. | K | | | | | | |
| E-3 Duty | kW | | | | | | |
| E-3 deltaT min. | K | | | | | | |
| E-4 Duty | kW | | | | | | |
| E-4 deltaT min. | K | | | | | | |

| Stream | | C1 | C2 | C3 | C4 | C5 | C6 |
|---|---|---|---|---|---|---|---|
| Pressure | bar(abs.) | 26.5 | 26.2 | 25.9 | 25.6 | 1.15 | 1.10 |
| Temperature | ° C. | 35.0 | 2.4 | −35.0 | −39.5 | −45.0 | −37.5 |
| Phase | — | Liquid | Liquid | Liquid | Liquid | Vapor | Vapor |
| Hydrogen | kg/h | | | | | | |
| Nitrogen | kg/h | | | | | | |
| Oxygen | kg/h | | | | | | |
| CO | kg/h | | | | | | |
| $CO_2$ | kg/h | | | | | | |
| Methane | kg/h | 0.0036 | 0.0036 | 0.0036 | 0.0036 | 0.0036 | 0.0036 |
| Ethane | kg/h | 0.0072 | 0.0072 | 0.0072 | 0.0072 | 0.0072 | 0.0072 |
| Propylene | kg/h | 71.6695 | 71.6695 | 71.6695 | 71.6695 | 71.6695 | 71.6695 |
| Propane | kg/h | 0.3493 | 0.3493 | 0.3493 | 0.3493 | 0.3493 | 0.3493 |
| Water | kg/h | | | | | | |
| Total Flow | kg/h | 72.0296 | 72.0296 | 72.0296 | 72.0296 | 72.0296 | 72.0296 |
| Dewpoint | ° C. | | | | | | |
| Propylene recovered | | | | | | | |
| E-1 Duty | kW | | | | | 8.4205 | |
| E-1 deltaT min. | K | | | | | 5.0 | |
| E-2 Duty | kW | | 1.7001 | | | | |
| E-2 deltaT min. | K | | 5.0 | | | | |
| E-3 Duty | kW | | | 1.7516 | | | |
| E-3 deltaT min. | K | | | 5.0 | | | |
| E-4 Duty | kW | | | | 0.2028 | | |
| E-4 deltaT min. | K | | | | 2.5 | | |

The calculation results summarized in table 5 demonstrated that, in case of a 30 weight-% propylene concentration in stream P1, still about 87% of the propylene contained in stream P1, had been recovered with stream P4. Furthermore, the absolute loss of propylene contained in stream P5 had been reduced to 4 kg/h, whereas this loss was 4.5 kg/h in case of Example 2. The calculated mass flowrate of stream C1 was about 72 kg/h compared to about 130 kg/h in case of Example 2. This was mainly caused by the calculated heat duty of about 8.4 KW for condensing unit E-1 compared to 15.3 kW in case of Example 2. Table 5 depicts further, that gaseous stream P3 was depleted in propylene, whereas liquid stream P4 was depleted in light-boiling compounds, compared to stream P1, as expected. According to Example 3 a liquid stream P6L was obtained, that contains about 94% of the propylene contained in stream P4. Stream P6V contains about 81 weight-% of light-boiling compounds, compared to about 50 weight-% of such compounds in stream P4. Stream P6V was, optionally after one or more workup steps, recycled back to the propylene-propane distillation unit to recover the propylene content of this stream. Stream P6L and stream C6, optionally after one or more workup steps, were recycled back to the epoxidation process as makeup streams of the main liquid propylene feed stream of the epoxidation process.

Example 4: Drying and Condensation of a Gaseous Vent Stream Obtained From a Propylene-Propane Distillation Unit as Described in Example 2 at Increased Propylene Content of Such Vent Stream Proceeding from Example 2 and the configuration as shown in FIG. 4 the calculations of Example 2 were repeated to evaluate the impact of an increased mass flowrate of propylene of stream P1. All compound mass flowrates of stream P1 from Example 2 were retained for Example 4 except for propylene, whose mass flowrate had been increased from about 78.7 kg/h to about 166.4 kg/h. Thus, for Example 4 a propylene concentration of 70 weight-% in stream P1 had been obtained compared to a propylene concentration of 52.5 weight-% in case of Example 2. According to Example 4 stream P1 was comprised of about 29 weight-% light-boiling compounds, whereas the related value of Example 2 had been about 46 weight-%. The concentrations of all compounds contained in stream P1 except propylene were reduced accordingly. Specifically, the water content of stream P1 had dropped to about 400 weight-ppm, compared to 640 weight-ppm in case of Example 2. Parameters of Example 2, that were not impacted by the increase of the propylene mass flowrate of stream P1, were retained for Example 4 with two exceptions. Related to condensing unit E-1 the minimum temperature difference to be achieved at the terminal ends of this unit by calculation had been reduced to 3.8 K compared to 5 K in case of Example 2. This was justified by the rationale, that in case of Example 4 stream P1 was comprised predominantly of condensable compounds, permitting closer approach temperatures compared to streams, that were dominated by non-condensable compounds as in all previous Examples. The minimum temperature difference to be achieved at the terminal ends of heat exchanger E-3 by calculation had been raised to 7.5 K compared to 2.5 K in case of Example 2. This had been required to avoid crossing of the heating curve temperatures of stream P4 and of the cooling curve temperatures of stream C2 internal of heat exchanger E-3. Table 6 provides a summary of calculated results for the heat and material balance according to Example 4 and the configuration as shown in FIG. 4.

the absolute loss of propylene contained in stream P5 had been reduced to 4.3 kg/h, whereas this loss was 4.5 kg/h in case of Example 2. The calculated mass flowrate of stream C1 was about 248 kg/h compared to about 130 kg/h in case of Example 2. Main reason was the calculated heat duty of about 28.9 kW for condensing unit E-1 compared to 15.3 KW in case of Example 2. Table 6 depicts further, that gaseous stream P3 was depleted in propylene, whereas liquid stream P4 was depleted in light-boiling compounds, compared to stream P1, as expected. According to Example 4 a stream P6L was obtained, that contains about 89% of the propylene contained in stream P4. Stream P6V contains

TABLE 6

Calculated results for gaseous vent stream drying and condensing by evaporating a liquid cooling medium stream according to Example 4 and the configuration as shown in FIG. 4.

| Stream | | P1 | P2 | P3 | P4 | P5 | P6L | P6V |
|---|---|---|---|---|---|---|---|---|
| Pressure | bar(abs.) | 24.4 | 24.2 | 24.0 | 24.0 | 23.9 | 17.5 | 17.5 |
| Temperature | °C. | 29.4 | 29.1 | −41.2 | −41.2 | 30.0 | 11.7 | 11.7 |
| Phase | — | Vapor | Vapor | Vapor | Liquid | Vapor | Liquid | Vapor |
| Hydrogen | kg/h | 2.6190 | 2.6190 | 2.5138 | 0.1052 | 2.5138 | 0.0099 | 0.0953 |
| Nitrogen | kg/h | 0.5775 | 0.5775 | 0.5045 | 0.0730 | 0.5045 | 0.0120 | 0.0610 |
| Oxygen | kg/h | 3.2490 | 3.2490 | 2.5068 | 0.7422 | 2.5068 | 0.1759 | 0.5663 |
| CO | kg/h | 2.5125 | 2.5125 | 2.1340 | 0.3785 | 2.1340 | 0.0718 | 0.3067 |
| $CO_2$ | kg/h | 44.2455 | 44.2455 | 8.6963 | 35.5492 | 8.6963 | 22.5529 | 12.9963 |
| Methane | kg/h | 1.8045 | 1.8045 | 1.0657 | 0.7388 | 1.0657 | 0.2786 | 0.4602 |
| Ethane | kg/h | 14.1840 | 14.1840 | 1.7625 | 12.4215 | 1.7625 | 9.1753 | 3.2462 |
| Propylene | kg/h | 166.3585 | 166.3585 | 4.3166 | 162.0419 | 4.3166 | 144.8408 | 17.2011 |
| Propane | kg/h | 2.0085 | 2.0085 | 0.0489 | 1.9596 | 0.0489 | 1.7664 | 0.1932 |
| Water | kg/h | 0.0960 | $3.7 \cdot 10^{-4}$ | 0.0 | $3.7 \cdot 10^{-4}$ | 0.0 | $2.4 \cdot 10^{-4}$ | $1.3 \cdot 10^{-4}$ |
| Total Flow | kg/h | 237.6550 | 237.5594 | 23.5491 | 214.0103 | 23.5491 | 178.8838 | 35.1264 |
| Dewpoint | °C. | | <−45 | | | | | |
| Propylene recovered | | | | | 97.4% | | | |
| E-1 Duty | kW | | | | | | | |
| E-1 deltaT min. | K | | | | | | | |
| E-2 Duty | kW | | | | | | | |
| E-2 deltaT min. | K | | | | | | | |
| E-3 Duty | kW | | | | | | | |
| E-3 deltaT min. | K | | | | | | | |
| E-4 Duty | kW | | | | | | | |
| E-4 deltaT min. | K | | | | | | | |

| Stream | | C1 | C2 | C3 | C4 | C5 | C6 |
|---|---|---|---|---|---|---|---|
| Pressure | bar(abs.) | 26.5 | 26.2 | 25.9 | 25.6 | 1.15 | 1.10 |
| Temperature | °C. | 35.0 | 28.6 | −33.7 | −39.0 | −45.0 | −36.2 |
| Phase | — | Liquid | Liquid | Liquid | Liquid | Vapor | Vapor |
| Hydrogen | kg/h | | | | | | |
| Nitrogen | kg/h | | | | | | |
| Oxygen | kg/h | | | | | | |
| CO | kg/h | | | | | | |
| $CO_2$ | kg/h | | | | | | |
| Methane | kg/h | 0.0124 | 0.0124 | 0.0124 | 0.0124 | 0.0124 | 0.0124 |
| Ethane | kg/h | 0.0248 | 0.0248 | 0.0248 | 0.0248 | 0.0248 | 0.0248 |
| Propylene | kg/h | 246.5302 | 246.5302 | 246.5302 | 246.5302 | 246.5302 | 246.5302 |
| Propane | kg/h | 1.2017 | 1.2017 | 1.2017 | 1.2017 | 1.2017 | 1.2017 |
| Water | kg/h | | | | | | |
| Total Flow | kg/h | 247.7691 | 247.7691 | 247.7691 | 247.7691 | 247.7691 | 247.7691 |
| Dewpoint | °C. | | | | | | |
| Propylene recovered | | | | | | | |
| E-1 Duty | kW | | | | | 28.8822 | |
| E-1 deltaT min. | K | | | | | 3.8 | |
| E-2 Duty | kW | | 1.2175 | | | | |
| E-2 deltaT min. | K | | 5.0 | | | | |
| E-3 Duty | kW | | | 10.4520 | | | |
| E-3 deltaT min. | K | | | 7.5 | | | |
| E-4 Duty | kW | | | | 0.8186 | | |
| E-4 deltaT min. | K | | | | 2.5 | | |

The calculation results summarized in table 6 demonstrated that, in case of a 70 weight-% propylene concentration in stream P1, about 97% of the propylene contained in stream P1, had been recovered with stream P4. Furthermore, about 50 weight-% of light-boiling compounds, compared to about 23 weight-% of such compounds in stream P4. Stream P6V was, optionally after one or more workup steps, recycled back to the propylene-propane distillation unit to recover the propylene content of this stream. Stream P6L and stream C6, optionally after one or more workup steps, were recycled back to the epoxidation process as makeup streams of the main liquid propylene feed stream of the epoxidation process.

Summary

From the Examples, it is apparent that the inventive process enables a recovery of propylene contained in stream P1, which otherwise would have been sent to incineration, in very good yields. The amount of disadvantageous light-boiling compounds could substantially be reduced by the inventive process, thus avoiding a disadvantageous re-introduction of light-boiling compounds in case of recycling. It was shown that the inventive process gave good results, irrespective of the propylene concentration in stream P1 (see Examples 1 and 2 compared to Example 3 and Example 4). In view of the recycling of stream C5, and respectively, C6, back to the epoxidation process as makeup stream of the main liquid propylene feed stream of the epoxidation process, it was considered advantageous to keep the mass flowrate required for stream C1 as small as possible. Prior to being used as makeup stream of the main liquid propylene feed stream of the epoxidation process gaseous stream C6 and respectively, C5, was required to be liquified. For that purpose, gaseous stream C6, and respectively, C5, has to be compressed to a pressure of about 17 bar (abs.) and condensed. Therefore, it was of economic benefit to keep the mass flowrate of gaseous stream C6 and respectively, C5, as small as possible. As summarized below in Table 7, it was apparent from Comparative Example 1 vs. Examples 1 and 2 that especially the heat exchanger E-3, and the combination of the two heat exchangers E-2 and E-3 respectively, i.e. the use of at least two cooling steps, positively affected the required mass flowrate of liquid cooling medium inlet stream C1.

TABLE 7

Comparison in view of required mass flowrate of liquid cooling medium stream C1

|  | Reference Example 1 | Comparative Example 1 | Example 1 | Example 2 |
|---|---|---|---|---|
| calculated mass flowrate of liquid cooling medium inlet stream C1 [kg/h] | 232 | 199 | 133 | 130 |
| flowrate reduction compared to Reference Example 1 [%] | — | 14 | 43 | 44 |

REFERENCE SIGNS

D Drying unit
E-1 Condensing unit
E-2 Heat exchanger
E-3 Heat exchanger
E-4 Heat exchanger
C1 to C6 Cooling medium streams
P1 to P6 Process streams
W Water removed in/by the drying unit

CITED LITERATURE

JP 2006-232744 A

Figure 1:
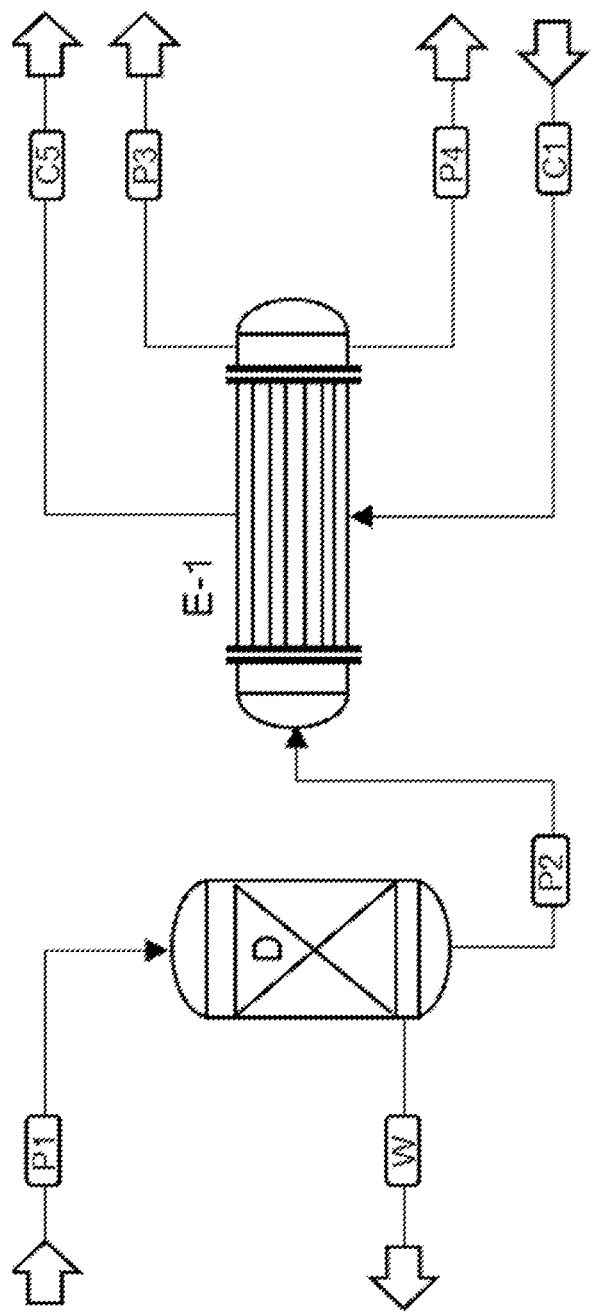
FIG. 1 shows a configuration for drying and condensing of a gaseous stream by evaporating a liquid cooling medium stream comprising a drying unit D and a condensing unit E-1. Said configuration was used in Reference Example 1. A gaseous stream P1 comprising propylene, water and a light-boiling compound, wherein the water content is in the range of from 100 to 7500 weight-ppm based on the total weight of the stream P1 enters the drying unit D at the top. Water is removed discontinuously by the drying unit as stream W, whereas a gaseous stream P2 comprising propylene, water and a light-boiling compound and having a water content lower than in the stream P1, is removed on the bottom of drying unit D. Gaseous stream P2 enters a first zone (not shown) of condensing unit E-1 where it is cooled down due to a cooling medium stream C1, which enters a second zone (not shown) of the condensing unit as liquid stream and is evaporated within the condensing unit E-1, thus giving a gaseous cooling medium stream C5, which leaves the cooling unit E-1. From the first zone of the condensing unit E-1 two streams P3 and P4 are removed: a gaseous stream comprising propylene and a light-boiling compound, which is depleted in propylene compared to P2, is removed as stream P3, and an at least partially liquid stream comprising propylene, which is depleted in light-boiling compounds compared to the stream P2, is removed as stream P4.
Figure 2:
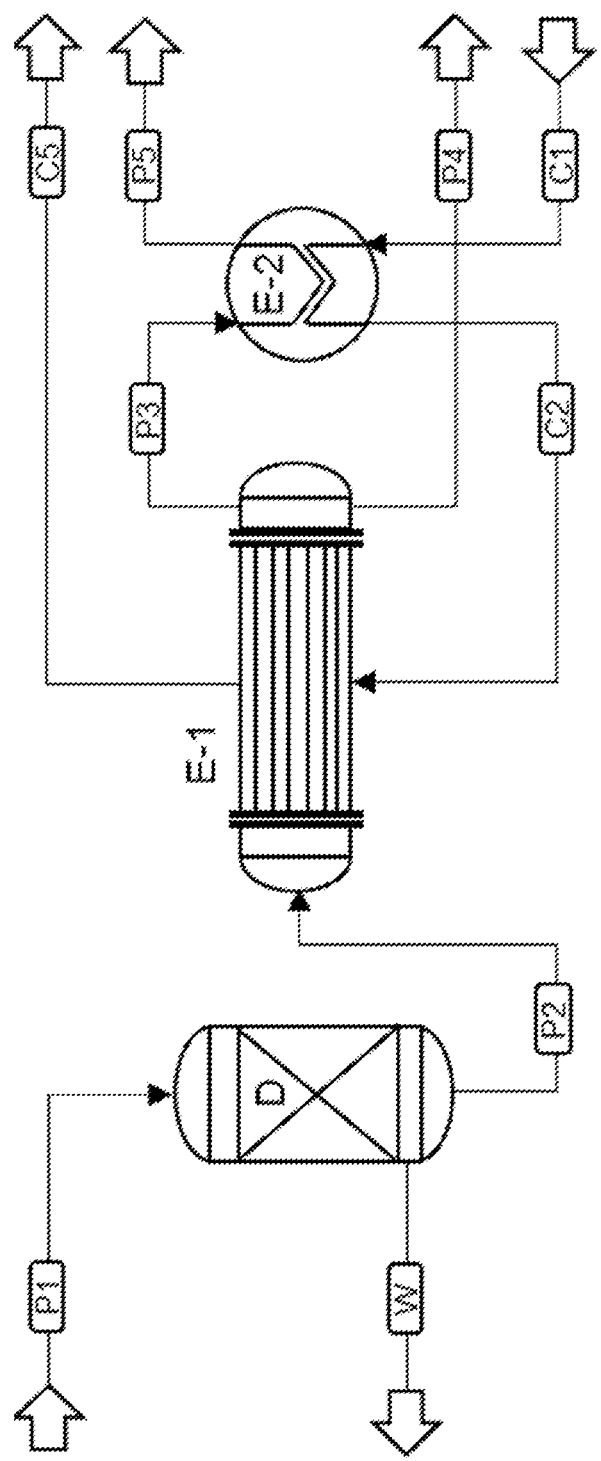
FIG. 2 shows the same configuration as FIG. 1, supplemented with a heat exchanger E-2. Said configuration was used in Comparative Example 2. Drying unit D, condensing unit E-1 and the streams P1, W, P2, P3 and P4 are as described above with respect to FIG. 1. Cooling medium stream C5 follows the same route as described above with respect to FIG. 1. A stream of liquid cooling medium C1 enters the heat exchanger E-2 and leaves it as cooling medium stream C2, wherein the liquid cooling medium stream C1 has a temperature $T_1$ and is cooled in the heat exchanger E-2 from $T_1$ to a temperature $T_2$, which is lower than $T_1$, so that cooling medium stream C2 has temperature $T_2$. In counter-current mode, stream P3 enters the heat exchanger E-2, is warmed-up and leaves the heat exchanger E-2 as stream P5, which has a temperature, which is higher than the temperature of stream P3. Cooling medium stream C2—instead of C1 as in FIG. 1—now enters the condensing unit E-1. Cooling medium stream C2, which enters a second zone (not shown) of the condensing unit as liquid stream, is evaporated within the second zone of the condensing unit E-1, thus giving a gaseous cooling medium stream C5, which leaves the cooling unit E-1.
Figure 3:
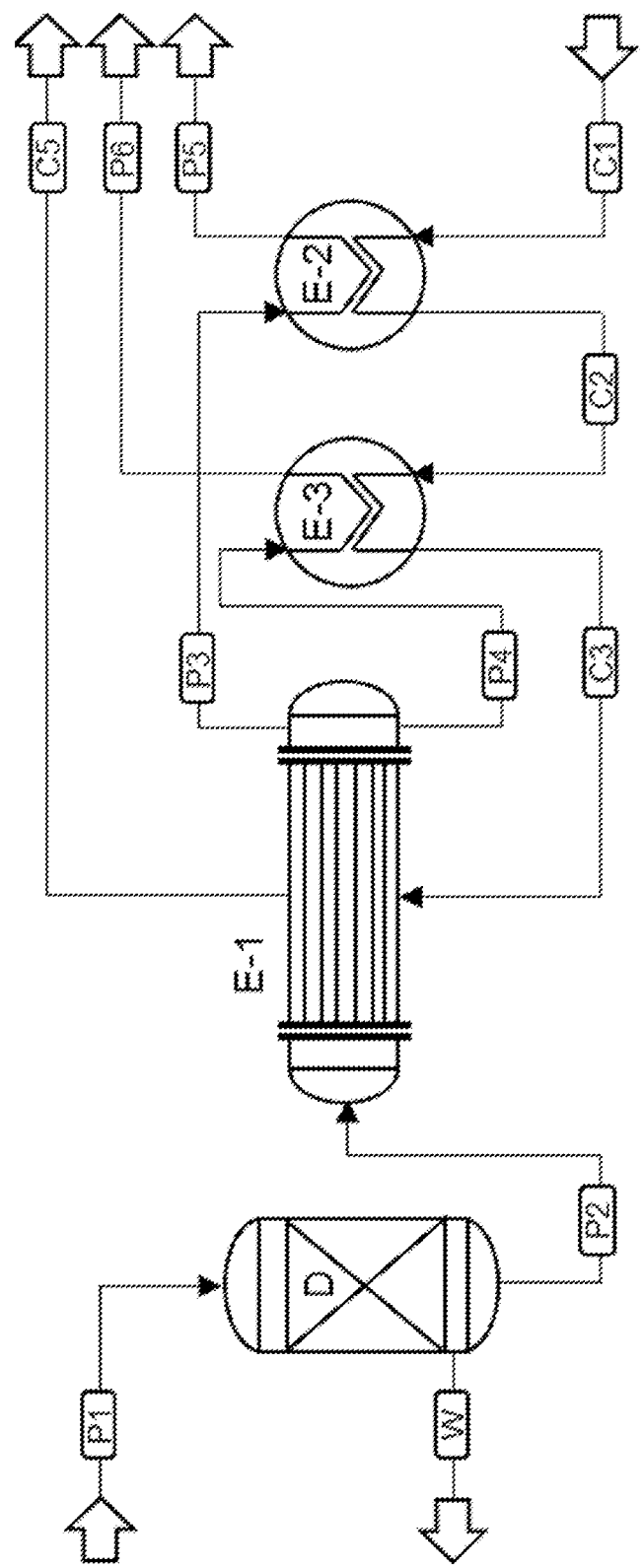
FIG. 3 shows the same configuration as FIG. 2, supplemented with a further heat exchanger E-3. Said configuration was used in Example 1. Drying unit D, condensing unit E-1, heat exchanger E-2, and the streams P1, W, P2, P3, P4, P5, are as described above with respect to FIG. 2. Cooling medium streams C5 and C1 follow the same route as described above with respect to FIG. 2. Cooling medium stream C2 enters the heat exchanger E-3, where it is cooled from temperature $T_2$ to a temperature $T_3$, which is lower than $T_2$ and higher than $T_4$ thus giving cooling medium stream C3 having temperature $T_3$, which is removed from heat exchanger E-3. Cooling medium stream C3—instead of C1 as in FIG. 1 or C2 as in FIG. 2—now enters the condensing unit E-1. Cooling medium stream C3, which enters a second zone (not shown) of the condensing unit as liquid stream, is evaporated within the second zone of the condensing unit E-1, thus giving a gaseous cooling medium stream C5, which leaves the cooling unit E-1. In counter-current mode, stream P3 enters the heat exchanger E-2, is warmed-up and leaves the heat exchanger E-2 as stream P5, which has a temperature, which is higher than the temperature of P3. Further, stream P4, in counter-current mode, enters heat exchanger E-3, is warmed-up and leaves the heat exchanger E-3 as stream P6, which has a temperature, which is higher than the temperature of P4
Figure 4:
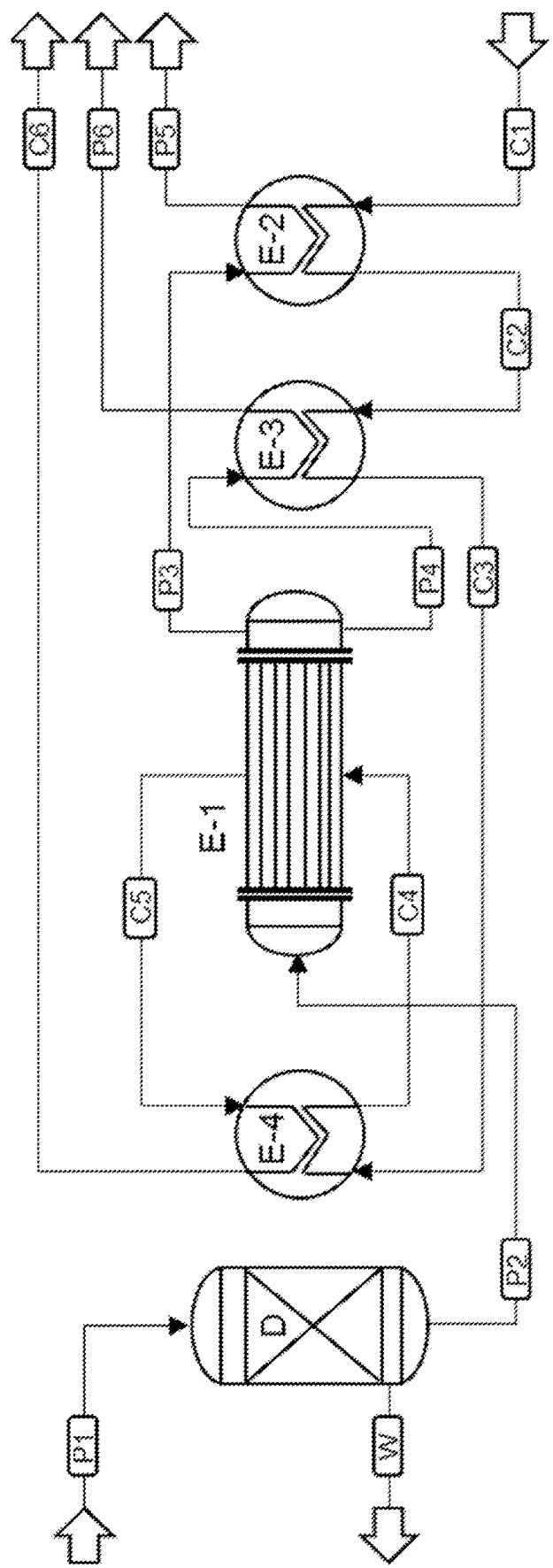
FIG. 4 shows the same configuration as FIG. 3, supplemented with a further heat exchanger E-4. Said configuration was used in Examples 2, 3 and 4. Drying unit D, condensing unit E-1, heat exchangers E-2 and E-3, and the streams P1, W, P2, P3, P4, P5 and P6, are as described above with respect to FIG. 3. Cooling medium streams C1 and C2 follow the same route as described above with respect to FIG. 3. Cooling medium stream C3 enters the heat exchanger E-4, where it is cooled from temperature $T_3$ to a temperature $T_4$, which is lower than $T_3$ thus giving cooling medium stream C4 having temperature $T_4$, which is removed from heat exchanger E-4. Cooling medium stream C4—instead of C1 as in FIG. 1, C2 as in FIG. 2 or C3 as in FIG. 3—now enters the condensing unit E-1. Cooling medium stream C4, which enters a second zone (not shown) of the condensing unit as liquid stream, is evaporated within the second zone of the condensing unit E-1, thus giving a gaseous cooling medium stream C5, which leaves the cooling unit E-1. In counter-current mode, gaseous cooling medium stream C5 having a temperature $T_6$ enters heat exchanger E-4, is warmed-up and leaves E-4 as gaseous stream C6, which has a temperature $T_7$, which is higher than $T_6$. Thus, a re-heating of the gaseous cooling medium stream C5 obtained from the condensing unit E-1 is done by pre-cooling the liquid cooling medium stream C3 from temperature $T_3$ to a temperature $T_4$ for stream C4.

The invention claimed is:

1. A process for recovering propylene from a gaseous stream comprising propylene and a light-boiling compound, the light-boiling compound having a boiling point at 1013 mbar (abs.) below −50° C., in a condensing unit, wherein the condensing unit has a first zone, and a second zone, wherein first and second zone are spatially separated from each other but are thermally conductive coupled to each other, the process comprising
(i) providing a gaseous stream comprising propylene and a light-boiling compound;
(ii) providing a liquid cooling medium stream having a temperature $T_1$;
(iii) cooling the liquid cooling medium stream in two or more cooling steps to a temperature $T_4$, which is lower than the temperature $T_1$, thereby obtaining a liquid cooling medium stream having temperature $T_4$;
(iv) feeding the gaseous stream comprising propylene and a light-boiling compound from (i) into the first zone of the condensing unit and feeding the liquid cooling medium stream having the temperature $T_4$ obtained from (iii) to the second zone of the condensing unit;
(v) expanding the liquid cooling medium stream, within the second zone, thereby obtaining from the first zone an at least partially liquid stream comprising propylene, which is depleted in light-boiling compounds compared to the stream provided in (i);
wherein cooling the liquid cooling medium stream from temperature Ti to temperature $T_4$ in (iii) is done in at least three cooling steps comprising:
(iii.1) cooling the liquid cooling medium stream from Ti to a temperature $T_2$, which is lower than T;
(iii.2) cooling the liquid cooling medium stream having temperature $T_2$ to a temperature $T_3$, which is lower than $T_2$ and higher than $T_4$;
(iii.3) cooling the liquid cooling medium stream having temperature $T_3$ to temperature $T_4$;
and
wherein the at least partially liquid stream comprising propylene, which is depleted in light-boiling compounds obtained in (v) has temperature $T_5$ and said stream is used in any one of (iii.1), (iii.2) and (iii.3) to cool the liquid cooling medium by heat exchange;
and/or
wherein a gaseous stream is obtained from the first zone in (v) comprising propylene and a light-boiling compound, which is depleted in propylene compared to the stream provided in (i), and which has temperature $T_5$ and wherein said further stream is used in any one of (iii.1), (iii.2) and (iii.3) to cool the liquid cooling medium by heat exchange;
and/or
wherein in (v) a stream comprising gaseous cooling medium having a temperature $T_6$, which is lower than $T_4$, is obtained from the second zone and said gaseous cooling medium stream having temperature $T_6$ coming from the condensing unit is used in any one of (iii.1), (iii.2) and (iii.3) to cool the liquid cooling medium prior to entering the condensing unit by heat exchange.

2. The process of claim 1, wherein the gaseous stream obtained from the first zone in (v) comprising propylene and a light-boiling compound, which is depleted in propylene compared to the stream provided in (i), and which has temperature $T_5$ is used to cool the liquid cooling medium in (iii.1) by heat exchange from $T_1$ to $T_2$ in a heat exchanger unit.

3. The process of claim 1, wherein the at least partially liquid stream comprising propylene, which is depleted in light-boiling compounds obtained in (v) having temperature $T_5$ is used to cool the liquid cooling medium in (iii.2) by heat exchange from $T_2$ to $T_3$ in a heat exchanger unit.

4. The process of claim 1, wherein the stream obtained in (v) from the second zone comprising gaseous cooling medium having a temperature $T_6$, which is lower than $T_4$, and said gaseous cooling medium stream having temperature $T_6$ coming from the condensing unit is used to cool the liquid cooling medium stream having temperature $T_3$ in (iii.3) by heat exchange to temperature $T_4$ in a heat exchanger unit, wherein the cooling medium stream, which has entered (iii.3) with $T_6$, leaves the heat exchanger unit with temperature $T_7$, which is higher than $T_6$.

5. The process of claim 1, wherein in each step (iii.1), (iii.2) and (iii.3) the cooling of the liquid cooling medium stream is done by heat exchange in a heat exchanger unit and the minimum temperature difference between the temperature of the stream comprising the liquid cooling medium, either at the inlet into the heat exchanger unit or at the outlet of the heat exchanger unit, and the temperature of the respective stream used for cooling the liquid cooling medium either at the inlet into the heat exchanger unit or at the outlet of the heat exchanger unit, is in the range of from 1 to 10° C.

6. The process of claim 1, wherein $T_6$ is a temperature ≥the boiling temperature of the cooling medium; and/or wherein $T_4$ is a temperature >the boiling temperature of the cooling medium.

7. The process of claim 1, wherein the light-boiling compound is a compound having a boiling point at 1013 mbar (abs.) in the range of from −260 to −60° C., wherein the light-boiling compound is selected from the group consisting of hydrogen, nitrogen, oxygen, carbon dioxide, carbon monoxide, ethane, ethylene, acetylene, methane and mixtures of two or more thereof.

8. The process of claim 1, wherein providing the stream comprising propylene and a light-boiling compound according to (i) comprises
   (i.1) providing a stream comprising propylene, water and a light-boiling compound, wherein the water content is in the range of from 100 to 7500 weight-ppm based on the total weight of the stream;
   (i.2) drying the stream provided in (i.1), thereby obtaining a stream comprising propylene, water and a light-boiling compound, wherein the water content is lower than in the stream provided in (i.1), based on the total weight of the stream, wherein the vapor dew point temperature of said stream is below temperature $T_6$.

9. The process of claim 1, wherein at least 90 weight-% of the stream comprising propylene obtained in (v), which is depleted in light-boiling compounds compared to the stream provided in (i), are liquid, based on the total weight of said stream;
   and/or
   wherein the stream which is depleted in light-boiling compounds obtained according to (v) comprise in the range of from 30 to 90 weight-% of propylene, based on the total weight of the stream;
   and/or
   wherein the stream depleted in propylene obtained according to (v) comprise in the range of from 40 to 98 weight-% of light-boiling compounds, based on the total weight of the stream.

10. The process of claim 1, wherein the stream which is depleted in light-boiling compounds obtained according to (v) is used for cooling in (iii.2), wherein a liquid stream comprising propylene is obtained from (iii.2), which is further depleted in light-boiling compounds compared to the stream comprising propylene obtained in (v), which is used for cooling in (iii.2), wherein the liquid stream obtained from (iii.2) comprises at least 1 weight-%, less light-boiling compounds than the stream obtained according to (v), each based on the total weight of the liquid stream obtained from (iii.2).

11. The process of claim 1, wherein the cooling medium stream comprises propylene.

12. The process of claim 1, wherein the at least partially liquid stream comprising propylene obtained in (v), which is depleted in light-boiling compounds optionally after one or more work-up steps, is used as a feed stream for preparing the stream comprising propylene and a light-boiling compound provided in and/or is used as part of a feed stream for the epoxidation process.

13. The process of claim 1, wherein the cooling medium stream comprises propylene and the cooling medium stream having a temperature $T_6$ according to claim 1, and/or the cooling medium stream having temperature $T_7$ according to claim 1, optionally after one or more work-up steps, is used as a feed stream for preparing the stream comprising propylene and a light-boiling compound provided in (i) and/or is used as part of a feed stream for the epoxidation process.

* * * * *